(12) United States Patent
Hadwen

(10) Patent No.: US 8,339,711 B2
(45) Date of Patent: Dec. 25, 2012

(54) ACTIVE MATRIX DEVICE AND METHOD OF DRIVING THE SAME

(75) Inventor: Benjamin James Hadwen, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/092,194

(22) Filed: Apr. 22, 2011

(65) Prior Publication Data

US 2012/0268804 A1   Oct. 25, 2012

(51) Int. Cl.
G02B 1/06   (2006.01)
(52) U.S. Cl. .......................... 359/665; 359/666
(58) Field of Classification Search .......... 359/665, 359/666
See application file for complete search history.

(56) References Cited

U.S. PATENT DOCUMENTS

| | | | |
|---|---|---|---|
| 6,565,727 B1 | 5/2003 | Shenderov | |
| 6,911,132 B2 | 6/2005 | Pamula et al. | |
| 7,163,612 B2 | 1/2007 | Sterling et al. | |
| 2008/0274513 A1 | 11/2008 | Shenderov et al. | |
| 2011/0272575 A1* | 11/2011 | Kim et al. | 250/288 |

FOREIGN PATENT DOCUMENTS

WO   2009/003184 A1   12/2008
WO   2010/041214 A1   4/2010

OTHER PUBLICATIONS

R.B. Fair, "Digital microfluidics: is a true lab-on-a-chip possible?", Microfluid Nanofluid (2007) 3;245-281 (cited on p. 1, line 18 of the specification).

* cited by examiner

*Primary Examiner* — William Choi
(74) *Attorney, Agent, or Firm* — Renner, Otto, Boisselle & Sklar, LLP

(57) ABSTRACT

An electrowetting on dielectric (EWOD) device which includes a plurality of array elements configured to manipulate one or more droplets of fluid on an array, each of the array elements including a corresponding array element driver circuit, wherein each array element driver circuit includes: a top substrate electrode and a first drive electrode between which the one or more droplets may be positioned, the top substrate electrode being formed on a top substrate, and the first drive electrode being formed on a lower substrate; and circuitry configured to selectively provide drive voltages to the first drive electrode to move the one or more droplets among the plurality of array elements, and wherein at least one of the plurality of array elements includes: a heater element also formed on the lower substrate and configured to heat the one or more droplets when positioned between the top substrate electrode and the first drive electrode of the at least one array element; and circuitry configured to control the heater element.

25 Claims, 21 Drawing Sheets

ACTIVE MATRIX DEVICE AND METHOD OF DRIVING THE SAME

TECHNICAL FIELD

The present invention relates to active matrix arrays and elements thereof. In a particular aspect, the present invention relates to digital microfluidics, and more specifically to active matrix electro-wetting-on-dielectric (AM-EWOD) devices. Electro-wetting-On-Dielectric (EWOD) is a known technique for manipulating droplets of fluid on an array. Active Matrix EWOD (AM-EWOD) refers to implementation of EWOD in an active matrix array, for example by using thin film transistors (TFTs). The invention further relates to methods of driving such devices.

BACKGROUND ART

Electro-wetting on dielectric (EWOD) is a well known technique for manipulating droplets of fluid by application of an electric field. It is thus a candidate technology for digital microfluidics for lab-on-a-chip technology. An introduction the basic principles of the technologycan be found in Digital microfluidics: is a true lab-on-a-chip possible?, R.B. Fair, Micofluid Nanofluid (2007) 3:245-281.

U.S. Pat. No. 6,565,727 (Shenderov, issued May 20, 2003) discloses a passive matrix EWOD device for moving droplets through an array.

U.S. Pat. No. 6,911,132 (Pamula et al, issued Jun. 28, 2005) discloses a two dimensional EWOD array to control the position and movement of droplets in two dimensions.

Many applications of EWOD technology require that the temperature of liquid droplets be controlled and/or varied. Examples include molecular diagnostics, material synthesis and nucleic acid amplification. The latter generally requires biochemical reagents to be cycled through two or more temperatures. One approach to achieving thermal control is to control the temperature of the entire device and its housing by external means, e.g. a hot plate. This suffers from the disadvantages that the rates of temperature change that can be achieved are generally low, that a long time is required for the whole arrangement to reach thermal equilibrium. Furthermore different droplets cannot simultaneously have different temperatures within the same device.

US20080274513 (Shenderov et al., published Nov. 6, 2008) discloses an alternative approach whereby multiple heating zones within a device are maintained at different temperatures, and the temperature of a droplet is controlled by using electro-wetting to move the droplets between the different zones.

WO2009/003184 (Wu, published Dec. 31, 2008) further discloses how such heating zones may be implemented by mounting heat exchangers on the back surfaces of the lower and upper substrates. A disadvantage of this method is that the thermal resistance between the heat exchangers and the droplets will be relatively large since in general the substrates are fabricated from a poorly thermally conducting material, e.g. glass. This will adversely affect the spatial resolution of the thermal control that can be achieved and also result in a long thermal time constant.

U.S. Pat. No. 7,163,612 (J. Sterling et al., issued Jan. 16, 2007) describes how TFT based electronics may be used to control the addressing of voltage pulses to an EWOD array by using circuit arrangements very similar to those employed in AM display technologies. Such an approach may be termed "Active Matrix Electro-wetting on Dielectric" (AM-EWOD).

A disadvantage of U.S. Pat. No. 7,163,612 is that it does not disclose any circuit embodiments for realising the TFT backplane of the AM-EWOD.

WO2010/041214 (Lasance et al., published Apr. 15, 2010) describes a microfluidic device comprising an array of fluidic chambers. Each chamber contains a heater integrated into the substrate which is independently controllable. Each chamber also contains a temperature sensor. WO2010/041214 further describes how integrated electronics may be disposed upon the substrate for driving the heaters and temperature sensors. A disadvantage of WO2010/041214 is that it does not describe any integrated means for moving the fluids between the different chambers of the device.

In view of the afore-mentioned disadvantages associated with conventional EWOD devices, there is a strong need for an EWOD device having prompt, high spatial resolution temperature control with simplified manufacture and reduced cost.

SUMMARY OF INVENTION

An EWOD device according to an aspect of the invention has a dual function heater capability integrated within the array element. A heater element is realised in the same conductive layer used to control droplet motion. The voltages at the heater element inputs may be controlled to facilitate two modes of operation:

An EWOD control mode whereby the heater element forms part of the structure controlling the movement of the droplet. The droplet can thus be moved on to the array element A heater mode, whereby the heater element dissipates energy to heat the droplet In described embodiments of the invention, the EWOD device is implemented as an AM-EWOD although the invention is not intended to be limited to active matrix type EWOD devices in the broadest sense. The device may incorporate TFT driver circuits for controlling the heat dissipated by the heater elements and for controlling droplet movement by EWOD.

The advantages of the invention include:

The heater element can perform two functions, assisting transfer of the droplet on and off the array element and dissipating energy to heat the droplet The heater capability can be implemented within the TFT control substrate thus simplifying manufacture and reducing cost According to an aspect of the invention, an electrowetting on dielectric (EWOD) device is provided which includes a plurality of array elements configured to manipulate one or more droplets of fluid on an array, each of the array elements including a corresponding array element driver circuit, wherein each array element driver circuit includes: a top substrate electrode and a first drive electrode between which the one or more droplets may be positioned, the top substrate electrode being formed on a top substrate, and the first drive electrode being formed on a lower substrate; and circuitry configured to selectively provide drive voltages to the first drive electrode to move the one or more droplets among the plurality of array elements, and wherein at least one of the plurality of array elements includes: a heater element also formed on the lower substrate and configured to heat the one or more droplets when positioned between the top substrate electrode and the first drive electrode of the at least one array element; and circuitry configured to control the heater element.

According to another aspect, the heater element includes a second drive electrode, and the circuitry configured to control the heater element is configured to switch the second drive electrode between a first mode of operation in which drive voltages are provided to the second drive electrode to control an electro-wetting force exerted by the second drive electrode on the one or more droplets, and a second mode of operation in which the drive voltages provided to the second drive electrode cause the second drive electrode to dissipate thermal energy to heat the one or more droplets.

In accordance with another aspect, the first mode of operation the circuitry configured to control the heater element holds the second drive electrode at a same voltage potential as the first drive electrode.

According to another aspect, in the second mode of operation the circuitry configured to control the heater element presents a difference in voltage potential across the second drive electrode to produce resistive heat energy.

According to still another aspect, the difference in voltage potential is pulse-width modulated to control a rate of heating in the second mode of operation.

According to another aspect, a value of the difference in potential is varied to control a rate of heating in the second mode of operation.

In accordance with still another aspect, the drive voltages provided to the first drive electrodes are in accordance with an AC driving scheme.

In accordance with yet another aspect, in the at least one of the plurality of array elements the second drive electrode is formed around a perimeter of the first drive electrode.

According to another aspect, the second drive electrode is oriented to maximize a distance to corners of the first drive electrode.

According to still another aspect, the at least one of the plurality of array elements includes multiple array elements.

In accordance with another aspect, the multiple array elements include contiguous array elements.

According to another aspect, a third drive electrode around a perimeter of the contiguous array elements is further included.

In accordance with another aspect, the circuitry configured to control the heater element within the multiple array elements is shared among the multiple array elements.

According to yet another aspect, each of the multiple array elements includes its own separate circuitry configured to control the heater element therein.

According to another aspect, the circuitry configured to control the heater element is configured to receive a control voltage through a same write functionality as the circuitry configured to selectively provide drive voltages to the first drive electrode.

In still another aspect, the at least one of the plurality of array elements further includes a temperature sensor.

According to yet another aspect, the temperature sensor is formed on the lower substrate so that the heater element is positioned between the temperature sensor and the one or more droplets.

According to another aspect, all or part of at least one of the circuitry configured to selectively provide drive voltages and the circuitry configured to control the heater element is formed on the lower substrate.

In accordance with still another aspect, all or part of at least one of the circuitry configured to selectively provide drive voltages and the circuitry configured to control the heater element is formed off of the lower substrate.

According to another aspect of the invention, a method for driving an electrowetting on dielectric (EWOD) device is provided. The EWOD device includes: a plurality of array elements configured to manipulate one or more droplets of fluid on an array, each of the array elements including a corresponding array element driver circuit, wherein each array element driver circuit includes: a top substrate electrode and a first drive electrode between which the one or more droplets may be positioned, the top substrate electrode being formed on a top substrate, and the first drive electrode being formed on a lower substrate; and circuitry configured to selectively provide drive voltages to the first drive electrode to move the one or more droplets among the plurality of array elements, and wherein at least one of the plurality of array elements includes: a heater element also formed on the lower substrate and configured to heat the one or more droplets when positioned between the top substrate electrode and the first drive electrode of the at least one array element, the heater element comprising a second drive electrode; and circuitry configured to provide drive voltages the second electrode, the method including the steps of: switching the second drive electrode between a first mode of operation in which the drive voltages are provided to the second drive electrode to control an electro-wetting force exerted by the second drive electrode on the one or more droplets, and a second mode of operation in which the drive voltages provided to the second drive electrode cause the second drive electrode to dissipate thermal energy to heat the one or more droplets.

According to another aspect, the method includes holding the second drive electrode at the same voltage potential as the first drive electrode during the first mode of operation.

In accordance with still another aspect, the method includes presenting a difference in voltage potential across the second drive electrode to produce resistive heat energy during the second mode of operation.

According to still another aspect, the method includes pulse-width modulating the difference in voltage potential to control a rate of heating in the second mode of operation.

According to another aspect, the method includes varying a value of the potential difference to control a rate of heating in the second mode of operation.

According to yet another aspect, the drive voltages provided to the first drive electrodes are in accordance with an AC driving scheme.

BRIEF DESCRIPTION OF DRAWINGS

In the annexed drawings, like references indicate like parts or features.

DESCRIPTION OF REFERENCE NUMERALS

Figure 1:
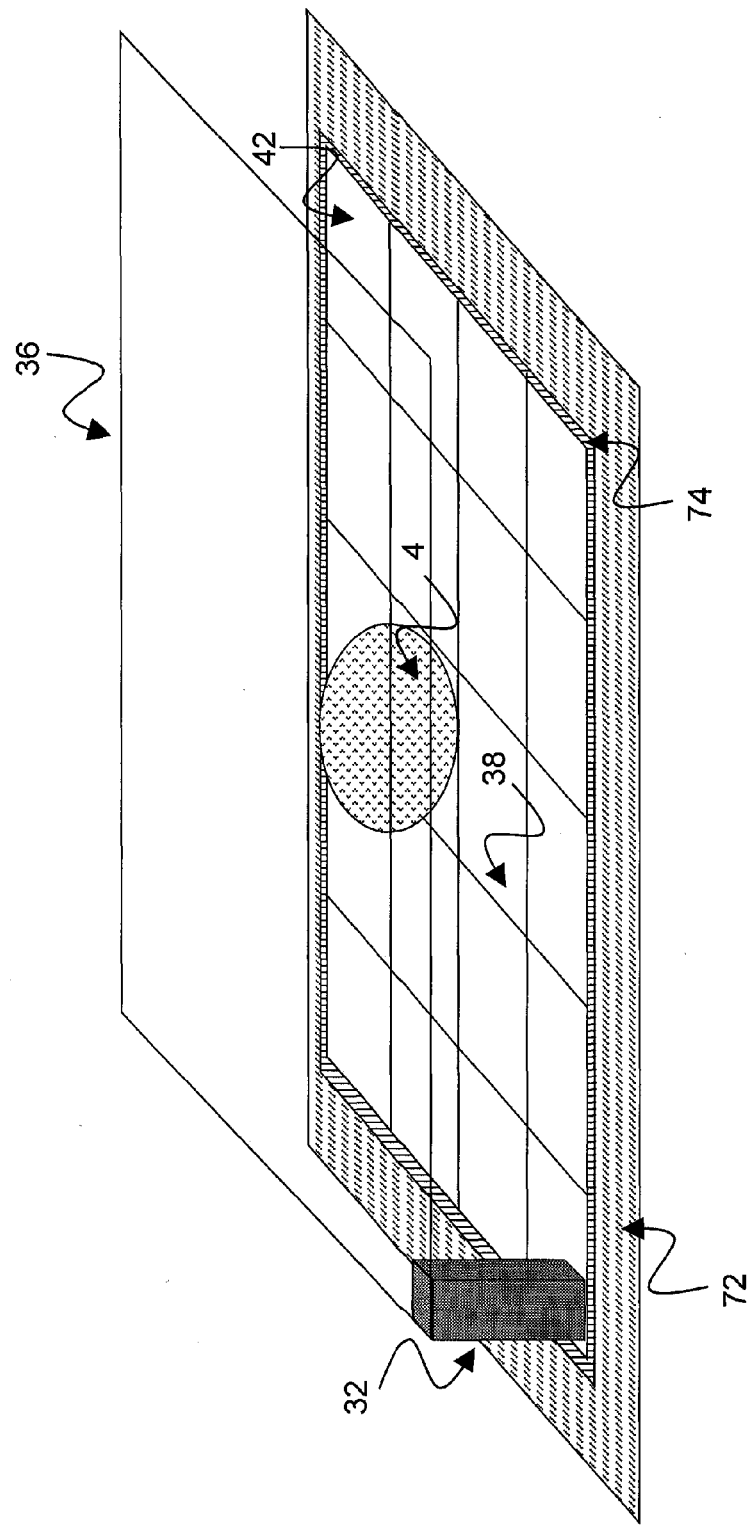
FIG. 1 shows an EWOD device in accordance with a first embodiment of the invention.

4 Liquid droplet
6 Contact angle theta
16 Hydrophobic surface
20 Insulator layer
26 Hydrophobic layer
28 Electrode
32 Spacer
34 Non-ionic liquid
36 Top substrate
38 Drive electrode
42 Electrode array
72 Substrate
74 Thin film electronics
76 Row driver circuit
78 Column driver circuit
80 Serial interface
82 Connecting wires
83 Transistor
84 Standard array element
86 Capacitor
88 Heater array element
90 EW drive electrode at $V_{EW}$
92 EW drive electrode at 0V
94 EW drive electrode as heater
102 Transistor
104 Transistor
106 Inverter
108 Inverter
110 Heater control circuit
114 Analog switch
116 Analog switch
118 Memory function
120 Inversion circuit
122 Transistor
124 Transistor
126 Transistor
128 Capacitor
130 Temperature sensor
132 Analog switch
134 Analog switch
136 Analog switch
138 Inverter
140 Analog switch

DETAILED DESCRIPTION OF INVENTION

Referring to FIG. 1, shown is an AM-EWOD device in accordance with a first exemplary embodiment of the present invention. The AM-EWOD device includes a lower substrate 72 with thin film electronics 74 disposed upon the substrate 72. A plurality of addressable EW drive electrodes 38 are arranged in an electrode array 42, having M×N elements where M and N may be any number. The thin film electronics 74 are arranged to selectively provide corresponding drive voltages to the drive electrodes 38 using conventional active matrix addressing schemes. An EWOD liquid droplet 4 is enclosed between the substrate 72 and a top substrate 36, although it will be appreciated that multiple droplets 4 can be present without departing from the scope of the invention.

Figure 2:
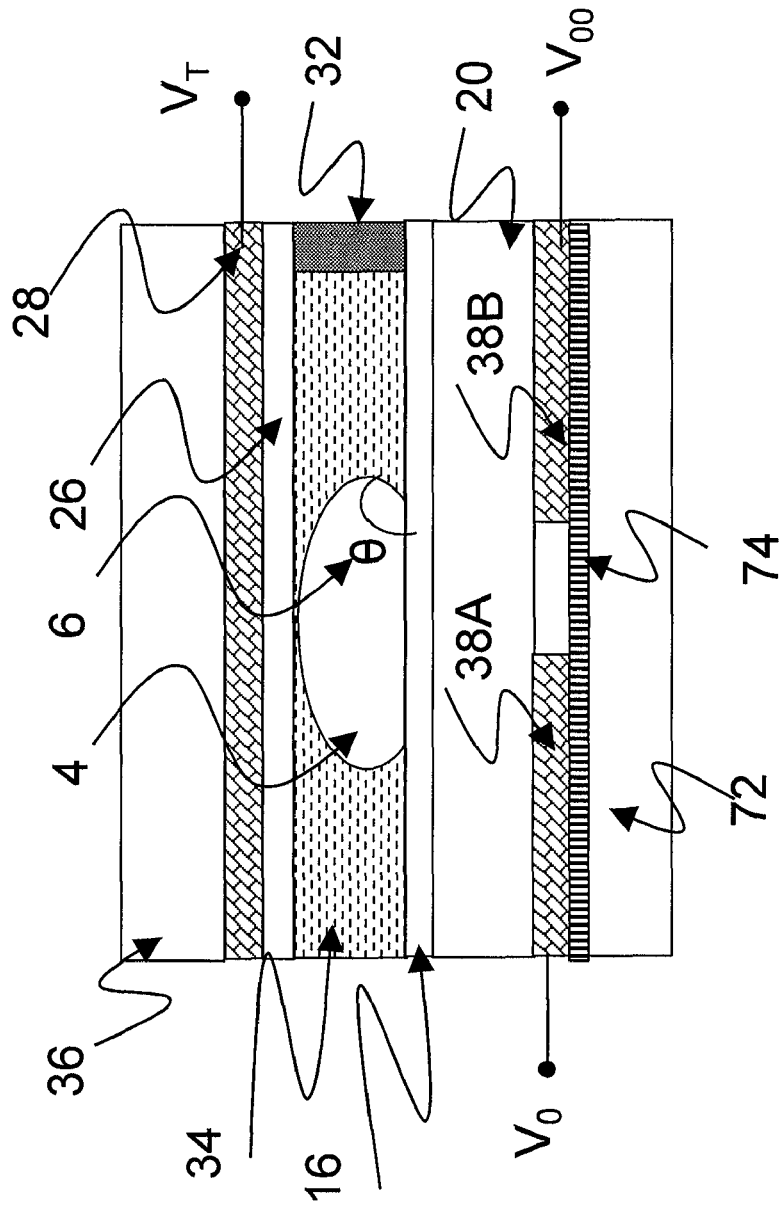
FIG. 2 shows a cross section through some of the array elements of the device according to the first embodiment.

FIG. 2 shows a pair of the array elements in cross section. As previously described, the device includes the lower substrate 72 having the thin-film electronics 74 disposed thereon. The uppermost layer of the lower substrate 72 (which may be considered a part of the thin film electronics layer 74) is patterned so that a plurality of drive electrodes 38 (e.g., 38A and 38B in FIG. 2) corresponding to respective array elements are realised. The drive electrodes 38 may be termed the EW drive elements 38. The term EW drive element 38 may be taken in what follows to refer both to the drive electrode 38 associated with a particular array element, and also to the node of an electrical circuit directly connected to this electrode 38. The droplet 4, consisting of an ionic material, is constrained in a plane between the lower substrate 72 and the top substrate 36. A suitable gap between the two substrates may be realised by means of a spacer 32, and a non-ionic liquid 34 (e.g. oil) may be used to occupy the volume not occupied by the droplet 4. An insulator layer 20 disposed upon the lower substrate 72 separates the conductive electrodes 38A, 38B from a hydrophobic surface 16 upon which the droplet 4 sits with a contact angle δ represented by θ. On the top substrate 36 is another hydrophobic layer 26 with which the droplet 4 may come into contact. Interposed between the top substrate 36 and the hydrophobic layer 26 is a top substrate electrode 28. By appropriate design and operation of the thin film electronics 74, different voltages, termed the EW drive voltages, (e.g. $V_T$, $V_0$ and $V_{00}$) may be applied to different electrodes (e.g. electrodes 28, 38A and 38B, respectively). The hydrophobicity of the hydrophobic surface 16 can thus be controlled, thereby facilitating droplet movement in the lateral plane between the two substrates 72 and 36.

Figure 3:
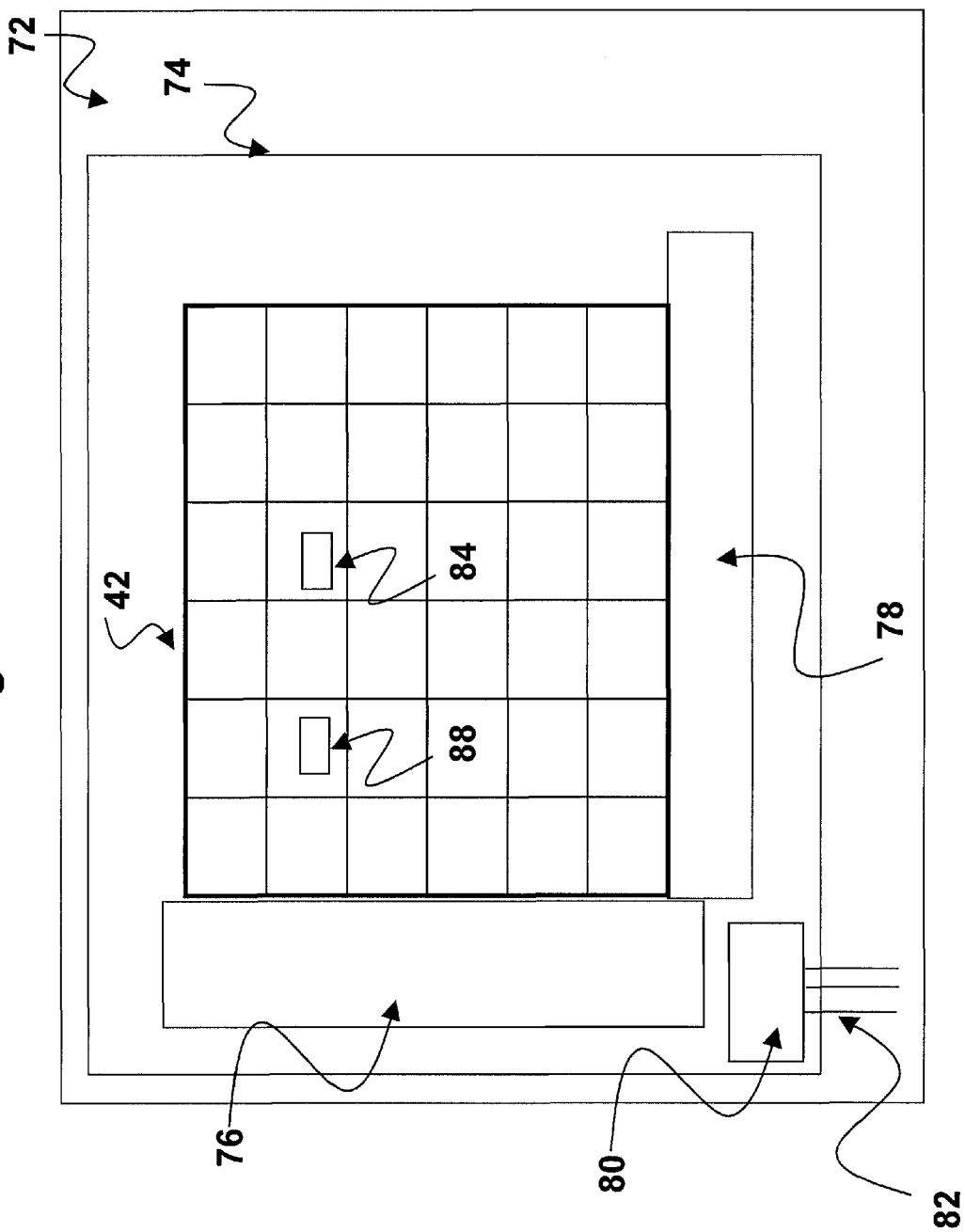
FIG. 3 shows an arrangement of thin film electronics in according to the first embodiment.

The arrangement of thin film electronics 74 upon the substrate 72 is shown in FIG. 3. Each element of the electrode array 42 contains an array element driver circuit, described in more detail below, representing circuitry configured to selectively provide drive voltages for controlling the potential of a corresponding drive electrode 38. Integrated row driver 76 and column driver 78 circuits are also implemented in thin film electronics 74 to supply corresponding drive voltages and control signals to the array element driver circuits as described herein. A serial interface 80 may also be provided to process a serial input data stream and supply the required voltages to the EWOD array 42. The number of connecting wires 82 between the array substrate and external drive electronics, power supplies etc. can be made relatively few, even for large array sizes.

The electrode array 42 according to the exemplary embodiment contains two types of array elements, a standard array element 84 and a heater array element 88. The standard array element 84 has, for example, a single EW drive electrode 38, and an array element driver circuit used to control the electrowetting voltage written to the drive electrode 38.

Figure 4:
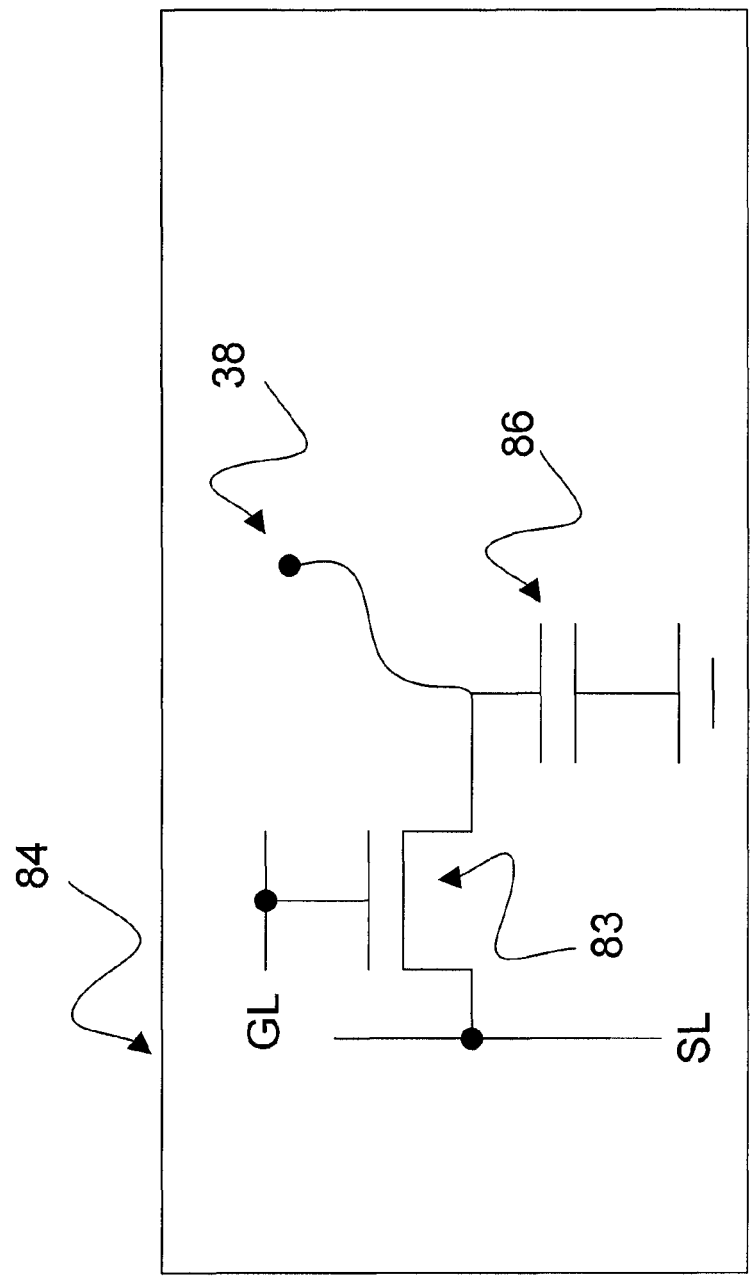
FIG. 4 shows an array element driver circuit of a standard array element according to the first embodiment.

FIG. 4 shows a possible design of array element driver circuit in an array element 84. This circuit comprises:
- A column write line SL (originating from the column driver 78), which may be common to array elements within a same column of the array 42
- A row select line GL (originating from the row driver 76), which may be common to array elements within a same row of the array 42
- An n-type switch transistor 83
- A capacitor 86

The circuit is connected as follows. A column line SL, common to all array elements in the same column, is connected to the source of transistor 83. A row line GL, common to all array elements within the same row, is connected to the gate of transistor 83. The drain of transistor 83 is connected to the EW drive electrode 38 (illustrated as node 38). A capacitor 86 is connected between the EW drive electrode 38 and a ground line.

To write a voltage to the EW drive electrode 38, the voltage is programmed onto the column line SL. The voltage on the row line GL is then taken high so that switch transistor 83 is turned on. The voltage on SL is then written to the EW drive electrode 38 and is stored across capacitor 86. According to a typical arrangement a voltage $V_{EW}$ may be written to the EW drive electrode 38 corresponding to a droplet actuated state, and a voltage 0V written to the EW drive electrode 38 corresponding to a de-actuated state, with the top electrode 28 potential $V_T$=0V.

Figure 5:
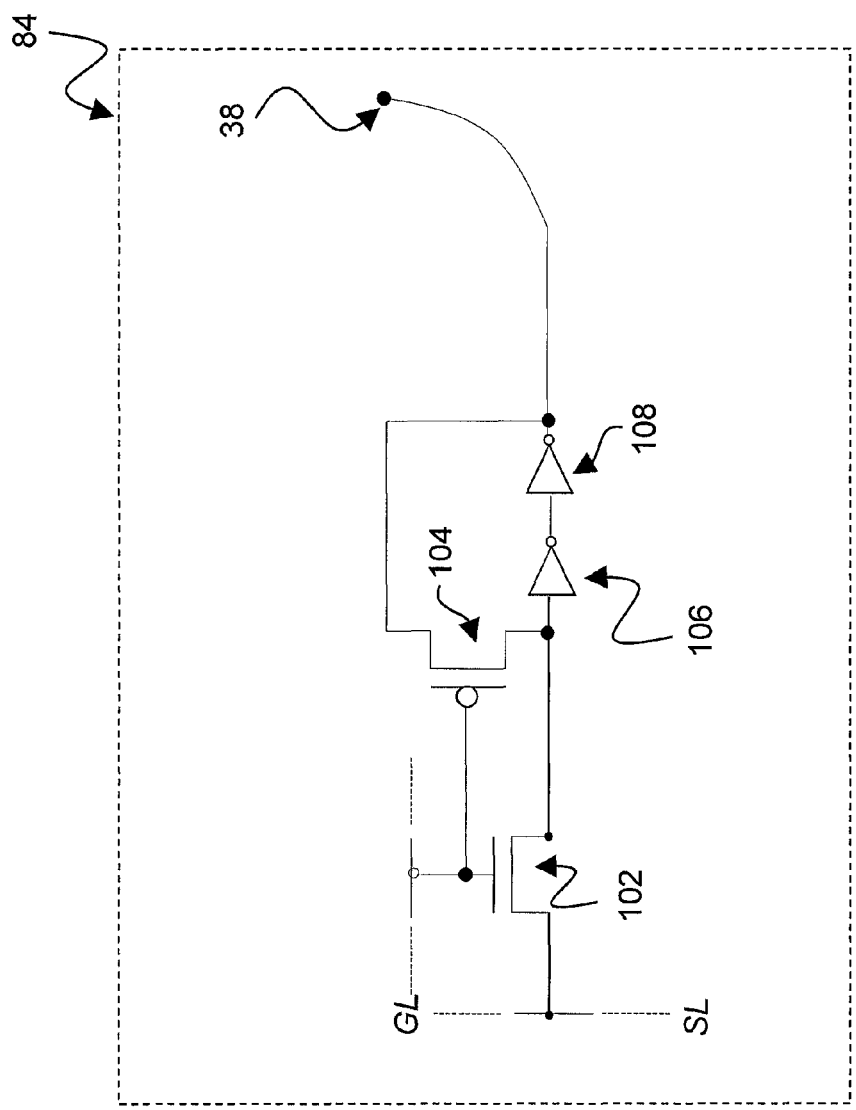
FIG. 5 shows an alternative array element driver circuit of a standard array element according to the first embodiment.

It will be apparent to one skilled in the art that other array element driver circuits for writing and storing a voltage to the EW drive electrode 38 are also possible. For example a Static Random Access Memory (SRAM) arrangement may be used as the driver circuit within the standard array element 84 as shown in FIG. 5. This array element driver circuit comprises:
- A column write line SL (originating from the column driver 78), which again may be common to array elements within the same column
- A row select line GL (originating from the row driver 76), which again may be common to array elements within the same row
- An n-type switch transistor 102
- A p-type switch transistor 104
- A first inverter 106
- A second inverter 108

The array element driver circuit is connected as follows:

The column write line SL is connected to the source of the switch transistor 102. The row select line GL is connected to the gate of the switch transistor 102 and the gate of the switch transistor 104. The drain of the switch transistor 104 is connected to the drain of the switch transistor 102 and to the input of the first inverter 106. The output of the first inverter 106 is connected to the input of the second inverter 108. The output of the second inverter 108 is connected to the source of the switch transistor 104 and to the EW drive electrode 38.

The array element driver circuit operates as a standard SRAM element. To write a voltage high level to the EW drive electrode 38, a high voltage is written to the column write line SL and then a voltage pulse is applied to the row select line GL. To write a voltage low level to the EW drive electrode 38 the same procedure is executed with a low voltage written to the column write line SL.

Figure 6A:
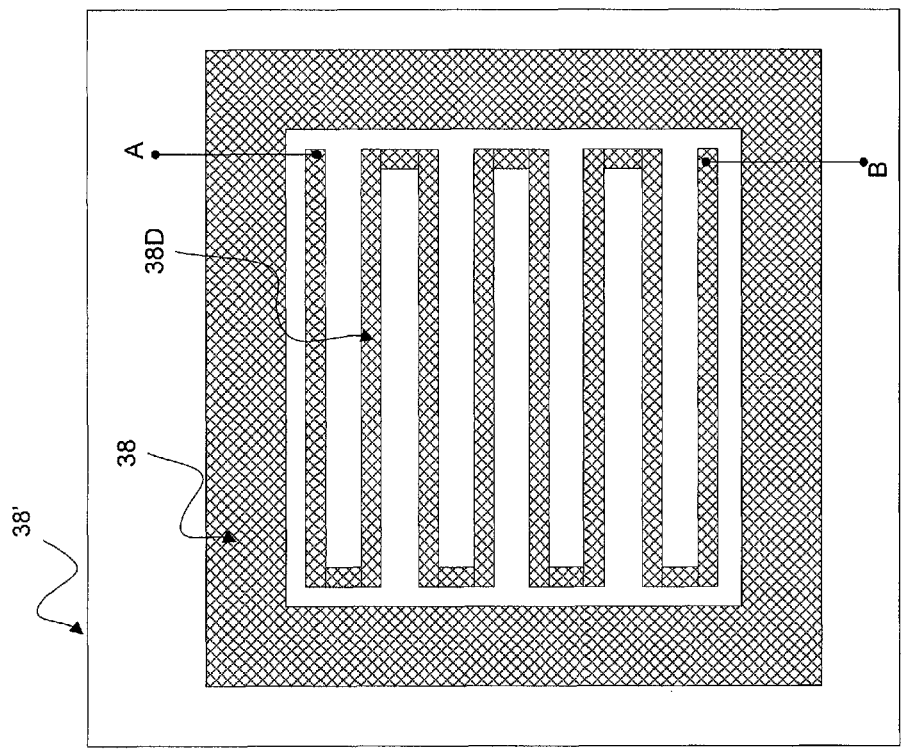
FIG. 6A shows an arrangement of the EW drive electrode according to the first embodiment.

Referring to FIG. 6A, each heater array element 88 differs from a standard array element 84 in that the heater array element 88 includes a composite drive electrode 38'. The composite drive electrode 38' includes both a standard EW drive electrode 38 (also referred to herein as a first EW drive electrode) and a second EW drive electrode 38D. The second EW drive electrode 38D is not electrically connected to the EW drive electrode 38, but rather is driven separately. The second EW drive electrode 38D has a supplementary function as a heater element. FIG. 6A shows a plan view of an exemplary arrangement of the thin-film conductive material used to form the two EW drive electrodes 38 and 38D within the composite drive electrode 38'. The standard EW drive electrode 38 in this case is formed around the perimeter of the second EW drive electrode 38. Consequently, the drive electrode 38 functions primarily the same as its counterpart in the standard array element 84. Two separate electrical inputs are formed to the second EW drive electrode 38D, denoted A and B. The second EW drive electrode 38D has a serpentine configuration as commonly found in resistive heater elements. The EW drive electrode 38D is thus electrically equivalent to a resistor element whose resistance R is a function of the material and of the geometry of the second EW drive electrode 38D arrangement.

Figure 6B:
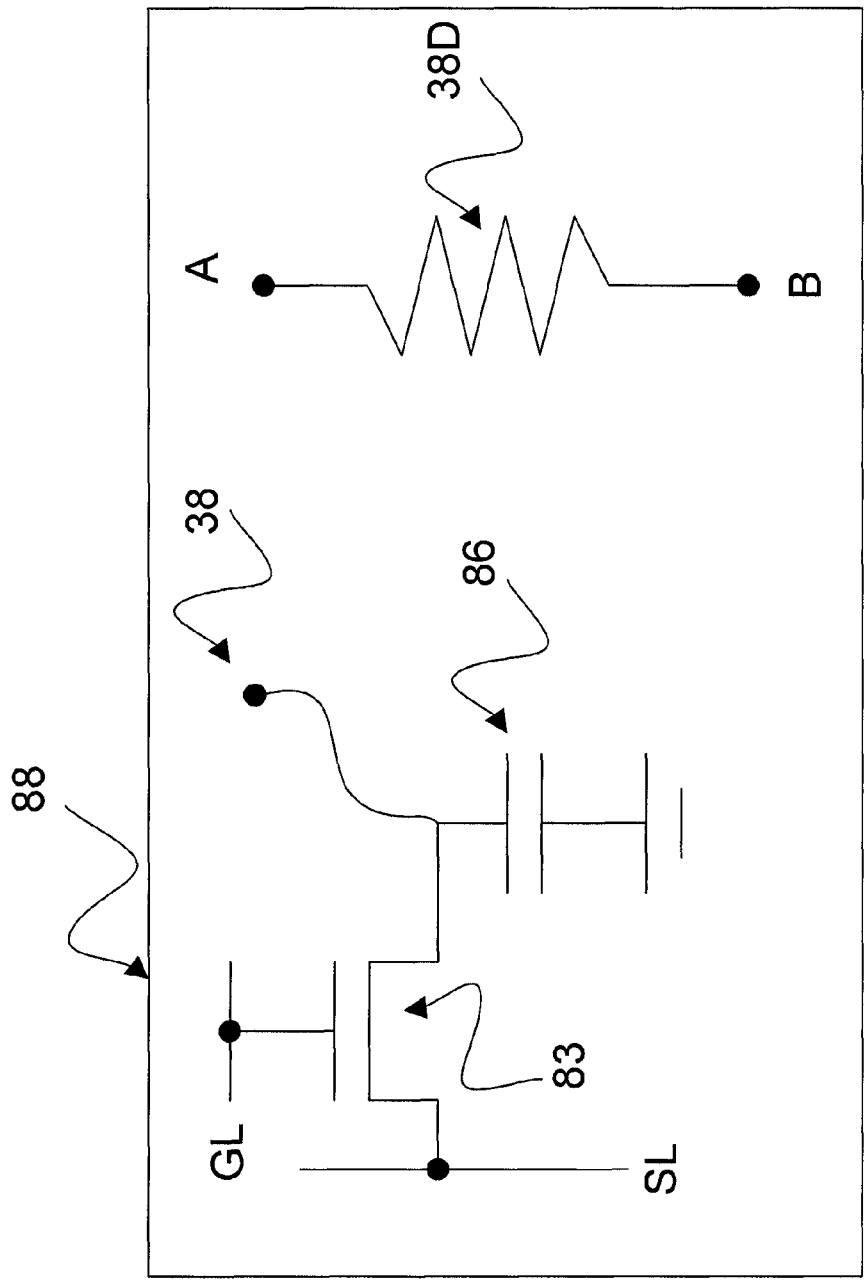
FIG. 6B shows an array element driver circuit of a heater array element according to the first embodiment.

Referring to FIG. 6B, the array element driver circuit for the heater array elements 88 is similar to that of the standard array elements with the exception that additional control lines provide respective signal voltages to inputs A and B to control the bias at the second EW drive electrode 38D, represented in FIG. 6B as a resistor element. The control circuitry for controlling the voltages supplied to inputs A and B may be realized using standard digital techniques and may either be provided externally (e.g. by a driver Printed Circuit Board) or may be integrated within the TFT substrate 72.

Figure 6C:
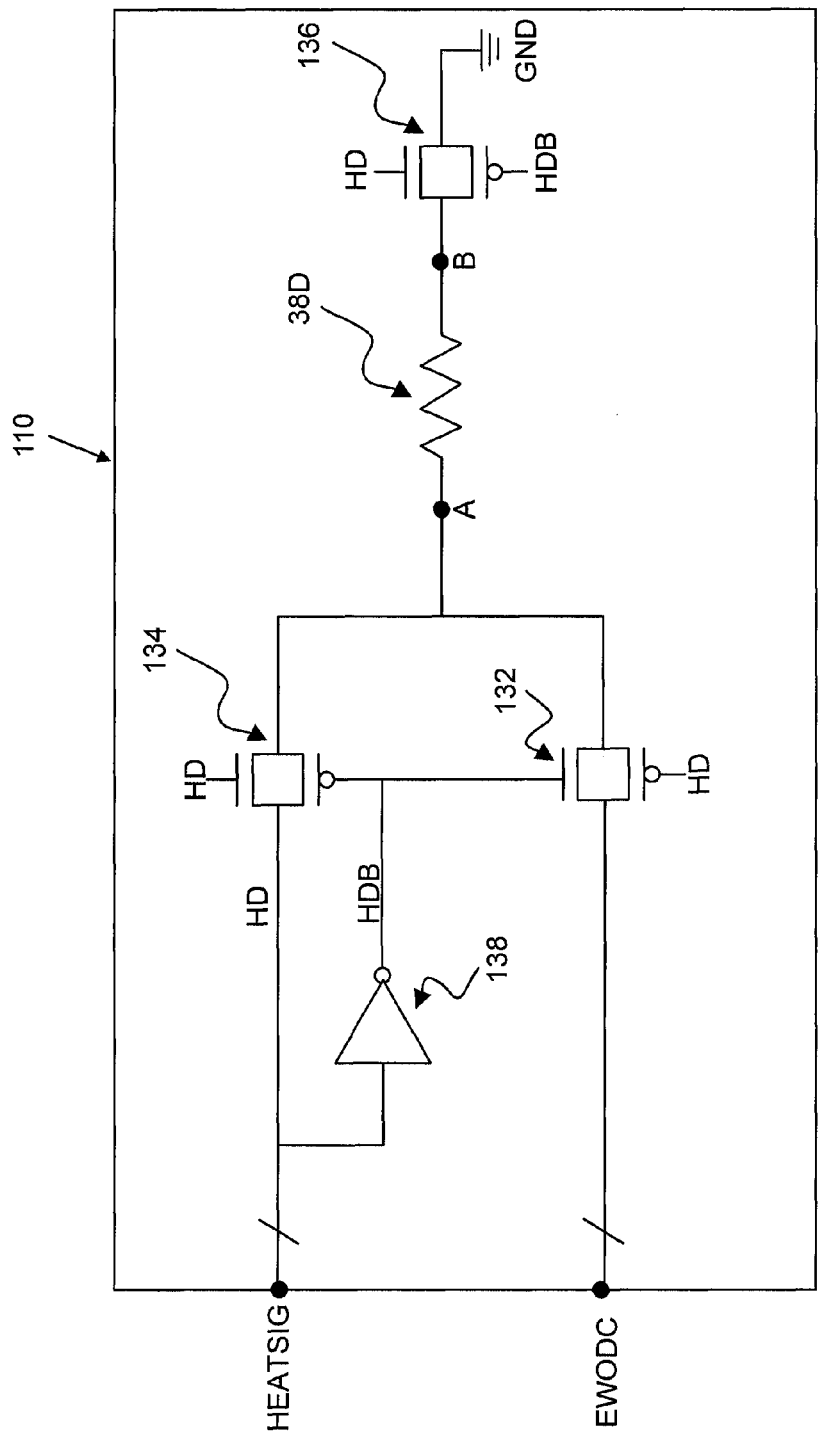
FIG. 6C shows a configuration for supplying drive signals in a heater array element.

An exemplary heater control circuit 110 for controlling the bias at inputs A and B, and thereby representing circuitry configured to control the heater element (second EW drive electrode 38D), is shown in FIG. 6C.

The heater control circuit 110 has two digital inputs denoted EWODC and HEATSIG and comprises:
- A first analog switch 132
- A second analog switch 134
- A third analog switch 136
- An inverter 138

The circuit 110 is connected as follows. The digital input signal HEATSIG is connected to the input of analog switch 134 and to the input of inverter 138 and to the gate of the n-type transistor of analog switch 134 and to the gate of the p-type transistor of the analog switch 132 and to the gate of the n-type transistor of the analog switch 136. This circuit node is denoted HD. The output of the inverter 138 is connected to the gate of the n-type transistor of analog switch 132 and to the gate of the p-type transistor of analog switch 134 and to the gate of the p-type transistor of analog switch 136. This circuit node is denoted HDB. The output of analog switch 132 is connected to the output of analog switch 134 which is connected to terminal A of the resistive heater element 38D. The input of analogue switch 136 is connected to terminal B of the resistive heater element 38D. The output of the analogue switch 136 is connected to ground.

The operation of the heater control circuit is as follows. The digital inputs HEATSIG and EWODC, which may be externally supplied to the device, have logic low level=0V and logic high level=$V_{EW}$.

When the digital input HEATSIG is at logic low level, node HD=0V and node HDB=VEW. Analog switch 134 is therefore closed, analog switch 132 is open and analog switch 136 is closed. Under these conditions the potential at nodes A and B is therefore determined by the logic level input EWODC. In the case where EWODC is at low level 0V, a potential of 0V is also obtained at nodes A and B. In the case where EWODC is at high level VEW, a potential of VEW is obtained at nodes A and B. Alternately, when the digital input HEATSIG is at logic high level, node HD=VEW and node HDB=0V. Analog switch 134 is therefore open, analog switch 132 is closed and analog switch 136 is open. In this case node B is discharged to 0V through analog switch 136, and node A is at potential VEW. This condition thus corresponds to a potential VEW being developed across the resistive heater element in the form of the EW drive electrode 38D. It will be obvious to one skilled in the art that the externally supplied input signal HEATSIG will be required to source a significant current and will be required to be adequately buffered in this regard.

The heater control circuit 110 is thus arranged to control the voltage inputs A and B so that at any one instant in time, any one of following three configurations are realized:

$A=B=V_{EW}$          Configuration 1

$A=V_{EW}, B=0V$         Configuration 2

$A=B=0V$           Configuration 3

In configuration 1, both inputs A and B of the second EW drive electrode 38D are held at the voltage high level $V_{EW}$. Consequently there is no potential energy drop across the electrode 38D and no energy is dissipated in the resistor in the form of heat. At the same time, the standard drive electrode 38 within the heater array element 88 may also be programmed to the voltage high level $V_{EW}$. The standard EW drive electrode 38 and second EW drive electrode 38D thus combine at a voltage high level $V_{EW}$ representing a droplet actuated state in the array element. In configuration 3, both inputs A and B are held at the voltage low level of 0V. Therefore, again no resistive heat energy is dissipated in the in the second EW drive electrode 38D. In configuration 3, the standard drive electrode 38 and the second EW drive electrode 38D are both programmed to the voltage low level 0V, representing a non-actuated state in the array element.

In configuration 2, a voltage $V_{EW}$ is dropped across the second EW drive electrode 38D as a result of the potential difference $V_{EW}$-0V across inputs A and B. A total power of $V_{EW}^2/R$ is therefore dissipated within the drive electrode 38D by Joule heating. The value of the resistor R will depend on the geometry of the heater element 38D and on the material used to fabricate this structure. Typically the value of R will be chosen so as to be small enough to enable significant amounts of heat to be dissipated so as to heat the liquid droplet 4 by an amount required by the application. For example, for polymerase chain reaction (PCR) an increase in temperature of the liquid droplet by to up to 90 degrees C. may be required. For other applications, smaller increases in temperature may be required, for example for many immuno-assays, a typical operating temperature is 37 degrees C. In choosing the value of the resistance R it may also be necessary to consider voltage drops due to the resistance of connecting wires and circuit components in the heater driver circuit (for example, with reference to Figure 6C, the resistance when turned on of analogue switches 134 and 136). For this reason it may be desirable that the value of resistance R is not so low that the voltage drops due to resistance of the wires etc become significant. A further consideration is that the value of R should be sufficiently large so as to avoid damage to the element due to excessive heating, e.g. which may cause it to melt. Taking all these factors into consideration, an actual optimized value of R is situation dependent but may typically be expected to be in the range 100-10 k ohms.

The second EW drive electrode 38D is thus switchable between two modes of operation. In the first it is used to control the electro-wetting force applied to a droplet by alternating between configurations 1 and 3. In the second mode the drive electrode 38D is used in configuration 2 to dissipate thermal energy which may be used to heat the droplet 4.

In a variant of this scheme, the voltage supplied to the input A of the second EW drive electrode 38D may be controlled by Pulse Width Modulation (PWM) of the input signal HEATSIG of the heater control circuit 110 so for that some fraction of the time this voltage is $V_{EW}$ and for the remaining fraction of the time this voltage is 0V. In the case the total power dissipated is equal to $nV_{EW}^2/R$ where parameter n corresponds to the duty cycle of the PWM controlled HEATSIG signal and is between 0 and 1. Thus by varying the duty cycle of the HEATSIG signal the rate of heating may be controlled. In a further variant of this scheme, the voltage high level of the digital input signal HEATSIG which then gets applied to terminal A in configuration 2 may be a value $V_X$, different from $V_{EW}$ so that the power dissipated in the resistor in this case is $V_X^2/R$.

Figure 7:
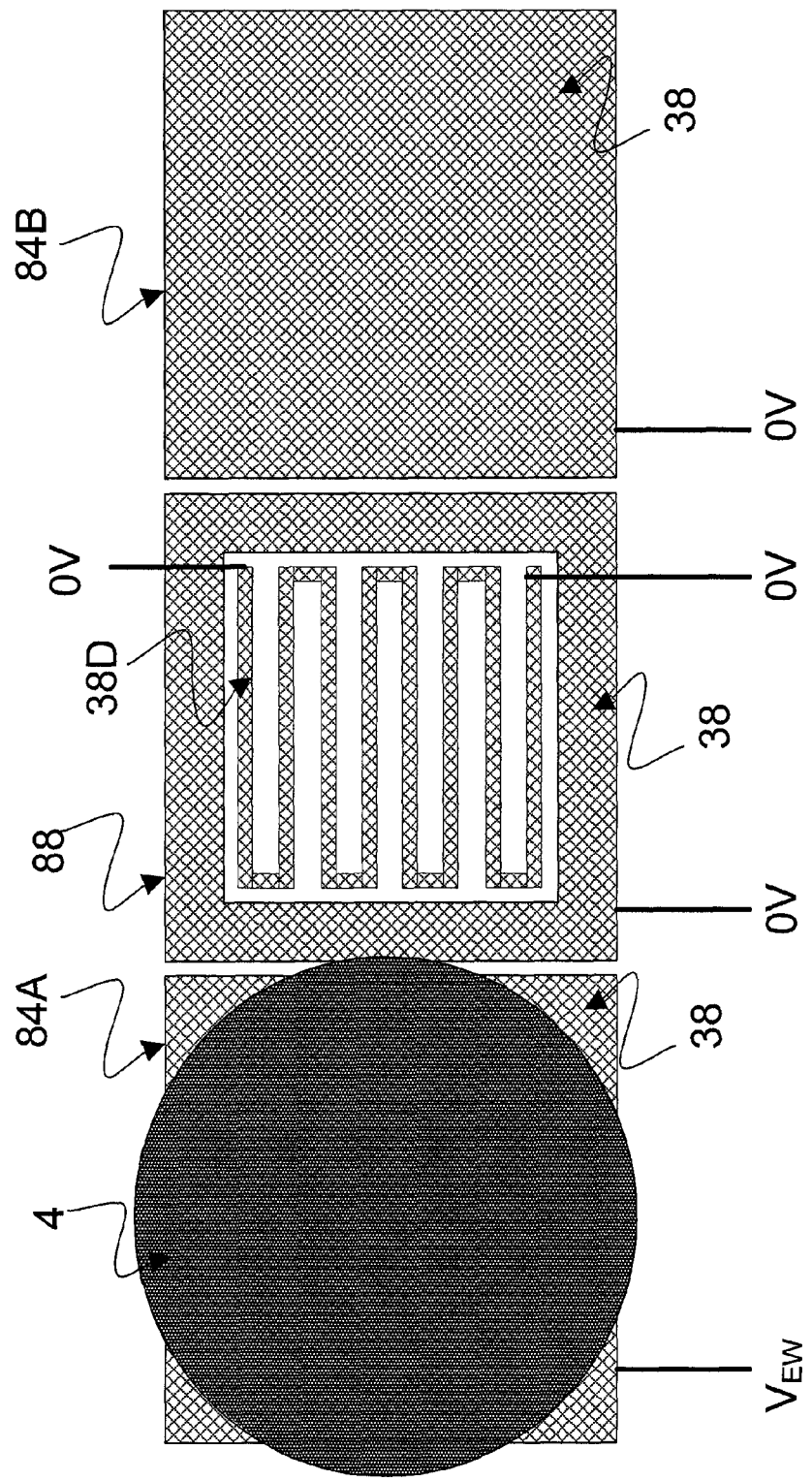
FIG. 7 shows an exemplary sequence for moving and heating a liquid droplet.

The second EW drive electrode 38D thus may be used to both control the movement of the droplet 4 and to heat the droplet 4. FIG. 7 shows an example of how this dual function may be utilized within the AM-EWOD device. A droplet 4 is initially present at the location of a first AM-EWOD array element 84A of conventional type. We describe a sequence whereby the droplet 4 is moved onto a second array element 88 where it is held in position and heated, before being moved away to a third array element 84B (conventional as the first array element 84A). When located at the first array element 84A, the voltage supplied to the EW drive electrode 38 of the first array element 84 is $V_{EW}$, the voltages supplied to EW drive electrode 38 and the second EW drive electrode 38D (inputs A and B) of the second array element 88 are 0V, and the voltage supplied to the EW drive electrode 38 of the third array element 84B is 0V. To move the droplet 4 onto the second array element 88, the voltage supplied to the EW drive electrode 38 of the second array element 88, and the voltages to both inputs A and B of the second EW drive electrode 38D are all taken to $V_{EW}$, and the voltage supplied to the EW drive electrode 38 of the first array element 84A is taken to 0V. The droplet 4 will then move under the action of the electro-wetting force from the first array element 84A to the second array element 88.

In order to heat the liquid droplet 4 at the second, heater array element 88, the voltage supplied to one of the inputs (e.g., B) of the EW drive electrode 38D is then taken to 0V, whilst the voltage supplied to the other input (e.g., A) is maintained at $V_{EW}$. Under these conditions a current flows through the EW drive electrode 38D and electrical energy is dissipated resulting in joule heating. This has the effect of heating the liquid droplet 4. The system may be maintained in this situation for sufficient time as is required to heat the droplet 4 to a temperature required by the application, e.g. for sufficient time to perform a chemical reaction. It may be noted that a voltage $V_{EW}$ may be maintained at the EW drive electrode 38 of the second, heater array element 88 for the entirety of the heating operation, thus maintaining the droplet in position at the second array element 88 during this time. Following the completion of the heating operation the voltages at both connections of the second EW drive electrode 38D are set to 0V. The droplet 4 may then be moved to the third array element 84B. This is achieved by taking the voltage of the EW drive electrode 38 of the second array element 88 to 0V and the voltage of the EW drive electrode 38 of the third array element 84B to $V_{EW}$. The droplet 4 then moves under the electro-wetting force to the third array element 84B, thus completing the operation.

Figure 8:
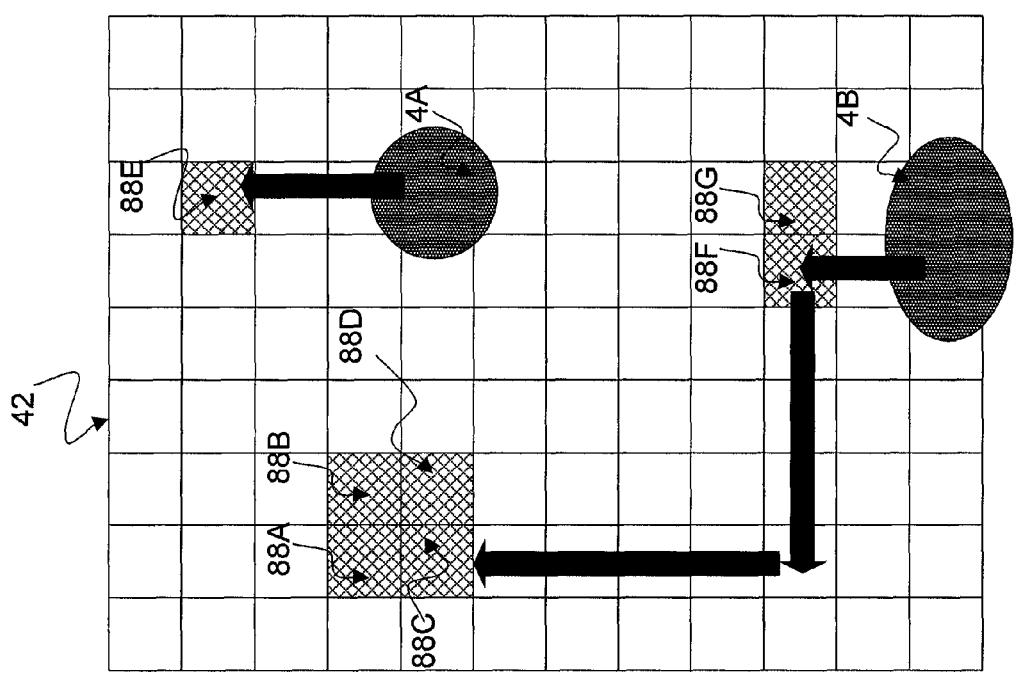
FIG. 8 shows multiple heater zones which may be implemented within an electrode array.

FIG. 8 shows an example implementation of the invention whereby multiple heating zones may be implemented within the electrode array 42. The figure shows two liquid droplets 4A and 4B, having different sizes, at different positions within the electrode array 42. The liquid droplet may be sized to cover a single array element (4A) or multiple contiguous array elements (4B). Various heating zones are defined by the positions of heater array elements 88A, 88B, 88C, 88D, 88E, 88F and 88G.

Multiple liquid droplets (e.g. 4A, 4B) may be moved between array elements and configured to pass through one or more heating zones as indicated by the arrows. The heating zones may comprise of single (e.g. 88E) or multiple (e.g. 88A, 88B, 88C, 88D) heater array elements configured to contain heating elements. The electrical inputs A and B of the second EW drive electrodes 38D of heater array elements 88 within a heater zone may be individual to each heater array element, for example such that a separate heater driver circuit 110 is provided for each heating element. Alternatively a number of heater array elements may be connected in parallel so as to be controlled by a shared common heater driver circuit 110, with the input A of each individual drive electrodes 38D connected together, and the input B of each individual drive electrode 38D also connected together.

Figure 9:
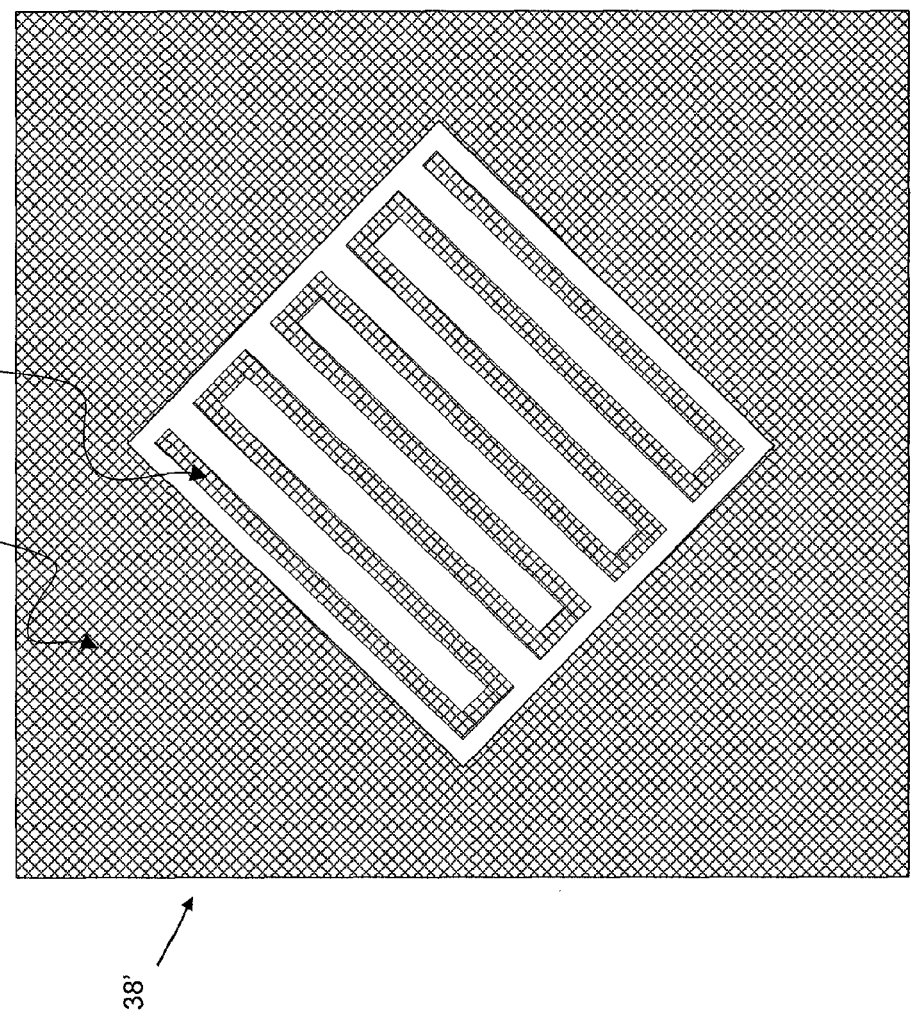
FIG. 9 shows an alternative arrangement of the EW drive electrode for realizing a heater zone.

Many alternative arrangements of the conductive layer used to form the EW composite drive electrode 38' are possible and may be included within the scope of the invention. FIG. 9 shows one such arrangement whereby the second EW drive electrode 38D has been rotated by 45 degrees to maximize the distance to the corners of the EW drive electrode 38. Such an arrangement may facilitate improved droplet transfer speeds.

Figure 10:
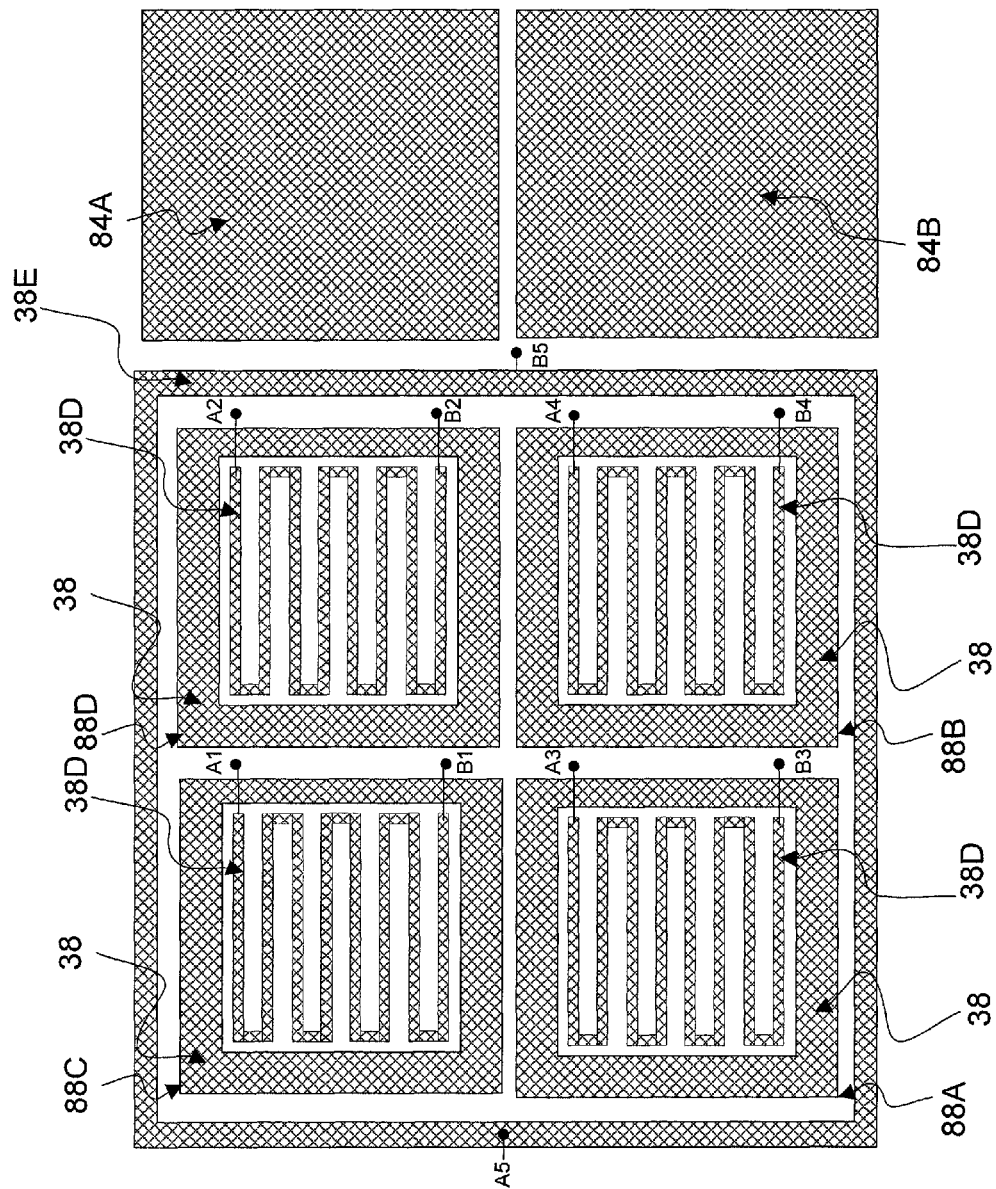
FIG. 10 shows an alternative arrangement of EW drive electrodes to realize a heater zone encompassing 2×2 array elements.

FIG. 10 shows an alternative arrangement whereby a heater zone is comprised from a sub-array of 2×2 heater array elements 88A, 88B, 88C and 88D. The heater zone may be surrounded by standard array elements 84 (e.g. 84A and 84B) on one side of the heater zone (as shown) or on multiple sides of the heater zone.

Each of these heater array elements contains an EW drive electrode 38 and a second EW electrode 38D as previously described. The electrical connections to the second EW drive electrodes 38D, denoted A1, A2, A3, A4 may be connected together or may be independently controlled, and likewise for B1, B2, B3 and B4. A third EW drive electrode 38E is arranged in a ring structure around perimeter of the 2×2 sub-array of heater array elements 88A, 88B, 88C and 88D as shown in the figure. The electrical connections A5 and B5 to the third EW drive electrode 38E may be arranged on opposite edges of the ring structure as shown in the figure. In this configuration there are two paths for current to flow from A5 to B5, around the top and bottom parts of the third EW drive electrode 38E. Electrically, the third EW drive electrode acts like two resistors in parallel and the electrical connections to A5 and B5 may be driven so as to dissipate heat within electrode 38E, so that the third EW drive electrode 38E contributes to the heating of any liquid present. The potential of the third EW drive electrode 38E may also be controllable (by means of the voltages supplied to A5 and B5) so as to assess with the control of the motion of liquid droplets to and away from the heater zone in a manner as previously described.

An advantage of the arrangement of FIG. 10 is that by appropriate choice of the resistances of the second EW drive electrodes 38D and the third EW drive electrode 38E and by appropriate control of the PWM signals applied to A1, A2, A3, A4 and A5, the temperature through the heating zone may be accurately controlled and may be arranged to be uniform or intentionally non-uniform through the heating zone. It will be apparent that the geometry shown in FIG. 10 is exemplary, and the concept may be extended so that the heater zone encompasses many heater array elements 88.

An advantage of the invention is that the heater capability can be implemented within the TFT control substrate thus simplifying manufacture and reducing cost.

A further advantage is that the heater element (i.e., drive electrode 38D) can be integrated within an AM-EWOD device within the same layer as is used for the EW drive electrodes 38 for electro-wetting control of the droplet movement. This allows for particularly efficient heater options for the following reasons:

The heater element is in close proximity to the droplet, being separated only by the insulator layer 20 and the layer used to form the hydrophobic surface 16. The total thickness of these layers is typically only a few hundred nanometers, so the thermal resistance between the heater element 38D and the droplet 4 is relatively small. This facilitates efficient heating (a high proportion of the dissipated thermal energy is used to heat the liquid droplet 4) which can also be performed rapidly, since the thermal time constant is relatively short.

The heater element may be conveniently realized in ITO. This has the advantage of being transparent (useful if the droplet is to be observed optically) and also of having a convenient value of electrical resistance for realizing an efficient heater element. The heater element is typically designed to have electrical resistance that is sufficiently low so that significant thermal energy is dissipated when configured to operate as a heater, but not so low that the current flowing causes appreciable voltage drops in connecting wires. The sheet resistance of ITO deposited in a typical thin film electronics process is of a convenient value for achieving a suitable resistance of heater element (typically ~few kohms)

The implementation described whereby the second EW drive electrode 38D can be configured to either control the movement of the droplet or to perform heating also has advantages: without the dual functionality of this element it may be difficult to move the droplet 4 onto the heater array element 88 in order for heating to take place. By including the dual functionality, the second EW drive electrode 38D may be used to both maneuver the droplet 4 into the correct position and then also to perform heating.

A further advantage is that the invention facilitates the creation of multiple heating zones within a device. These may be used for applications requiring droplet temperatures to be varied between multiple values or for thermal cycling to be implemented, e.g. in nucleic acid synthesis.

Figure 11:
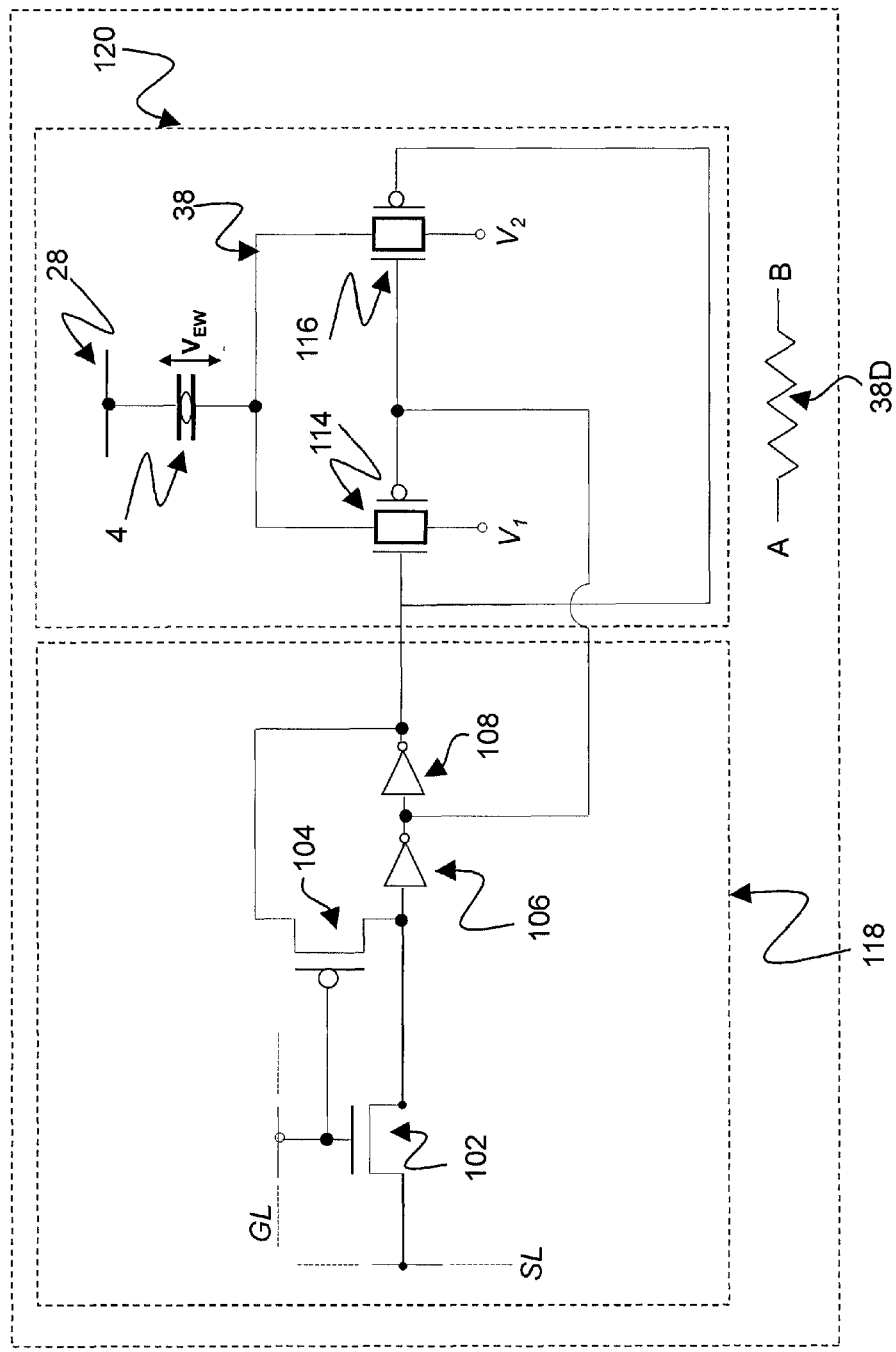
FIG. 11 shows an array element circuit of in accordance with a second embodiment of the invention.

A second embodiment of the invention is as the first embodiment, where an alternative array element driver circuit for an array element 84 is used, shown FIG. 11.

The array element driver circuit according to this embodiment contains the following elements:

A memory function 118 consisting of an SRAM cell and comprising:

A column write line SL (originating from the column driver 78), which may be common to array elements within the same column A row select line GL (originating from the row driver 76), which may be common to array elements within the same row An n-type switch transistor 102

A p-type switch transistor 104

A first inverter 106

A second inverter 108

An inversion circuit 120 comprising:

A first analog switch 114

A second analog switch 116

A voltage supply $V_1$, which may be common to all elements within the array

A second voltage $V_2$, which may be common to all elements within the array

Heater array elements 88 within the array 42 may also contain a heater drive electrode 38D, denoted in FIG. 11 as a resistor element with connecting inputs A and B, and an array driver circuit as exemplified in FIG. 6C and which may be as described in the first embodiment of the invention.

Referring to Figure 11, the circuit is connected as follows:

The column write line SL is connected to the source of the switch transistor 102. The row select line GL is connected to the gate of the switch transistor 104 and the gate of the switch transistor 102. The drain of the switch transistor 104 is connected to the drain of the switch transistor 102 and to the input of the first inverter 106. The output of the first inverter 106 is connected to the input of the second inverter 108, the gate of the p-type transistor of the first analog switch 114 and the gate of the n-type transistor of the second analog switch 116. The output of the second inverter 108 is connected to the gate of the n-type transistor of the first analog switch 114 and to the gate of the p -type transistor of the second analog switch 116 and to the source of the switch transistor 104. The voltage supply $V_1$ is connected to the input of the first analog switch 114. The voltage $V_2$ is connected to the input of the second analog switch 116. The outputs of the first analog switch 114 and the second analog switch 116 are each connected to the conductive electrode 38 forming the EW drive electrode.

The operation of the array element circuit 84 is described as follows:

The array element circuit 84 includes the aforementioned two functional blocks, the memory function 118 and the inversion circuit 120. The memory function 118 is a standard SRAM circuit as previously described.

In the case where logic "1" state is written to the memory function 118, the inversion circuit 120 becomes configured such that the first analog switch 114 is turned on, and the second analog switch 116 is turned off. As a result supply voltage $V_1$ is applied to the conductive electrode forming the EW drive electrode 38. In the case where logic "0" state is written is written to the memory function 118, the inversion circuit 120 becomes configured such that the first analog switch 114 is turned off, and the second analog switch 116 is turned on. In this case supply voltage $V_2$ is applied to the EW drive electrode 38. The supply voltage $V_2$ is also applied to the electrode 28 of the top substrate. As a result, the electro-wetting voltage $V_{EW}$ maintained across the droplet 4 is either:

0, in the case where logic "0" is written to the memory.

$V_1$-$V_2$, in the case where logic "1" is written to the memory

Figure 12A:
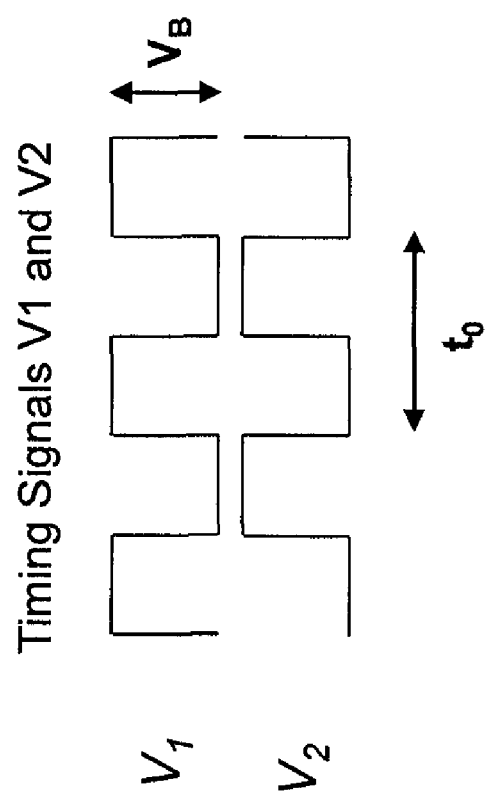
FIG. 12A shows timing signals of the supply voltages for operation of the array element circuit according to the second embodiment.

FIG. 12A shows the time dependence of the waveforms of supply voltage $V_1$ and supply voltage $V_2$ according to this embodiment. $V_1$ is a square wave of amplitude $V_B$ and period $t_0$, and supply voltage $V_2$ is the logical inverse of $V_1$.

Therefore in the case where logic "1" is written to the memory, the electro-wetting voltage $V_{EW}$ (i.e., $V_1$-$V_2$) is a square wave of rms amplitude $V_B$.

This AC method of AM-EWOD driving is advantageous for several reasons:

High frequency AC mode operation of the AM-EWOD is possible, with various associated advantages including An AC drive scheme can facilitate improved insulator reliability. Under the action of a DC field, ions in the droplet 4 have a tendency to migrate through the insulator layer dielectrics at defect sites, giving rise to pin-holing of the device. This can result in device failure. At high AC frequencies devices are less susceptible to this method of breakdown since the mobile ions are subjected to an oscillating rather than a DC field.

EWOD devices operated with a DC drive scheme have been observed to suffer from degraded performance through operating lifetime, a phenomenon whereby droplet motion becomes increasingly sluggish over time. This effect is not yet fully understood but has been postulated to be due to polarisation of the insulator and/or hydrophobic layers. Operating with an AC drive scheme avoids this effect since the insulator and hydrophobic layers are not subject to a DC electric field An AC drive scheme may facilitate improved droplet dynamics for operations such as transport, mixing etc, although the reasons for this are not fully understood.

The described method of AC driving has particular advantages for AM-EWOD since the maximum voltage switched by the TFTs making up analog switches 114 and 116 is only that equal to the electro-wetting voltage. For a given maximum voltage rating for the TFTs, this facilitates a higher electro-wetting voltage than would be possible in the case of AC operation where the top electrode 28 was maintained at constant potential.

When the AC method of driving is employed, the driving voltage signals applied to the inputs A and B of the second EW drive electrode 38D may also be AC signals. The second EW drive electrode 38D may therefore be configured to perform the dual functions of assisting with droplet control by electro-wetting and of providing Joule heating as previously described.

Figure 12B:
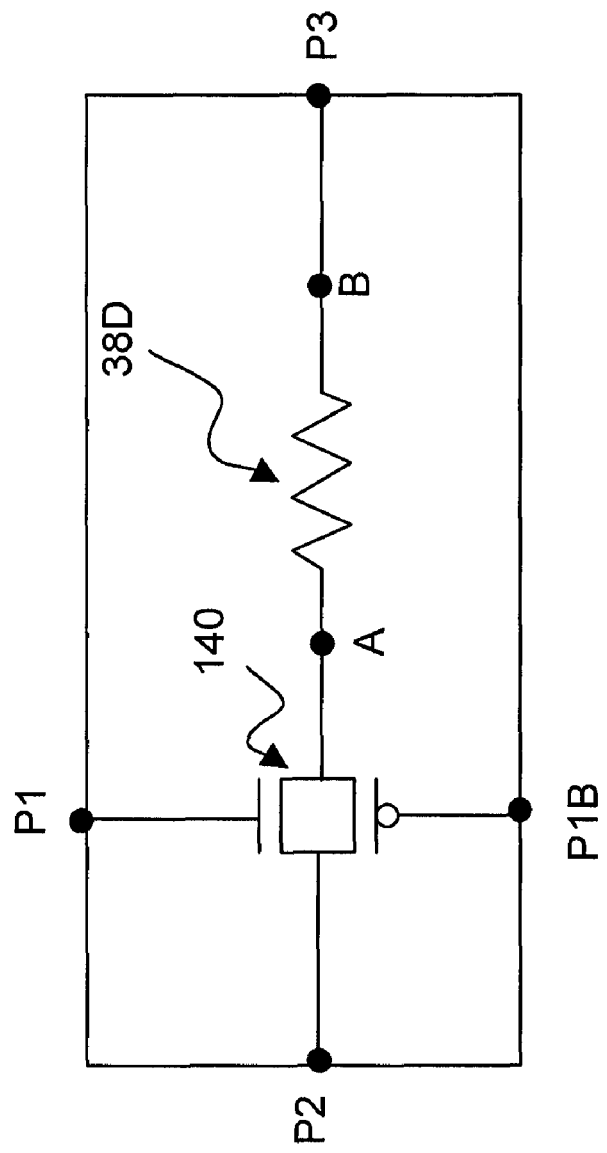
FIG. 12B shows a configuration for supplying drive signals in a heater array element.

In a similar way to as was described for the first embodiment, the voltage signals supplied to inputs A and B may be provided by any one of a number means. FIG. 12B shows a possible configuration that may be used for supplying drive signals to inputs A and B of the second EW drive electrode 38D.

The circuit consists of an analog switch 140 and the second EW drive electrode 38D. An input signal P2 is connected to the input of the analog switch 140. The output of the analog switch 140 is connected to terminal A of the second EW drive electrode 38D. Terminal B of the second EW drive electrode 38D is connected to the input signal P3. The input signal P1 is connected to the gate of the n-type transistor of the analog switch 140. The input signal P1B, which is the logical complement of input signal P1, is connected to the gate of the p-type transistor of analog switch 140. The operation of this circuit is as follows. When input signal P1 is at logic high level (and P1B at logic low level) the analog switch 140 is turned on. Joule heating may then be performed by applying input signals of opposite polarity to input signals P2 and P3. When P2=logic high, P3=logic low, the direction of current flow through the EW drive electrode 38D is from P2 to P3; when P2=logic low and P3=logic high, the direction of current flow is from P3 to P2. Alternatively, when P1 is at logic low level the analog switch 140 is turned off and no current will flow through the EW drive electrode 38D. In this instance the potential of the EW drive electrode is determined by the logic signal applied to P3.

Figure 13:
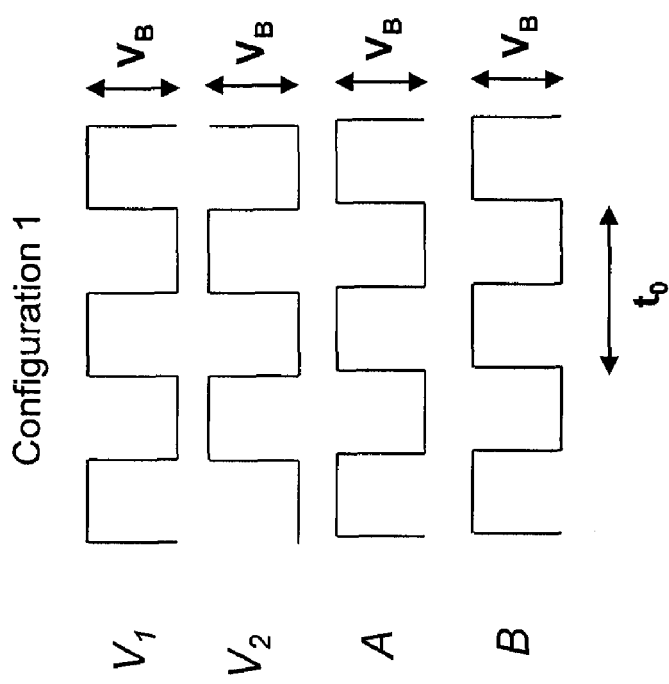
FIG. 13 shows timing signals for operation of the array element circuit in a first configuration according to the second embodiment.
Figure 14:
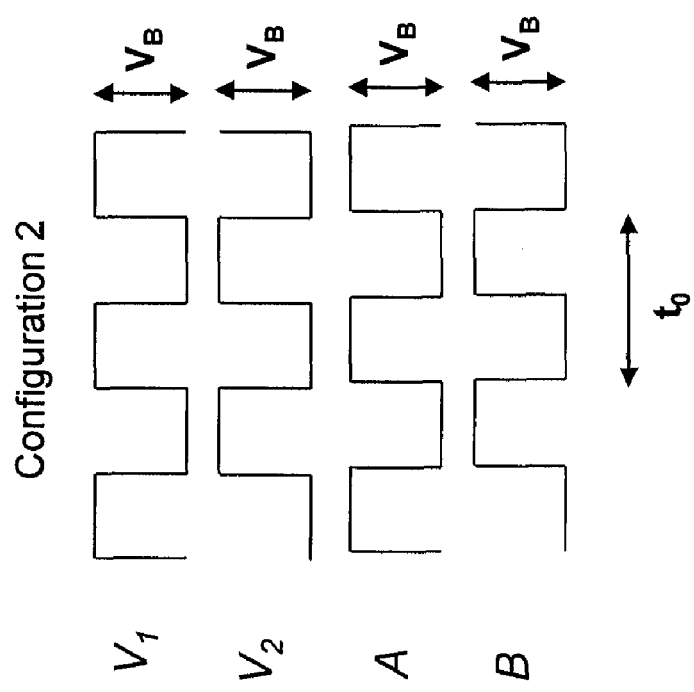
FIG. 14 shows timing signals for operation of the array element circuit in a second configuration according to the second embodiment.
Figure 15:
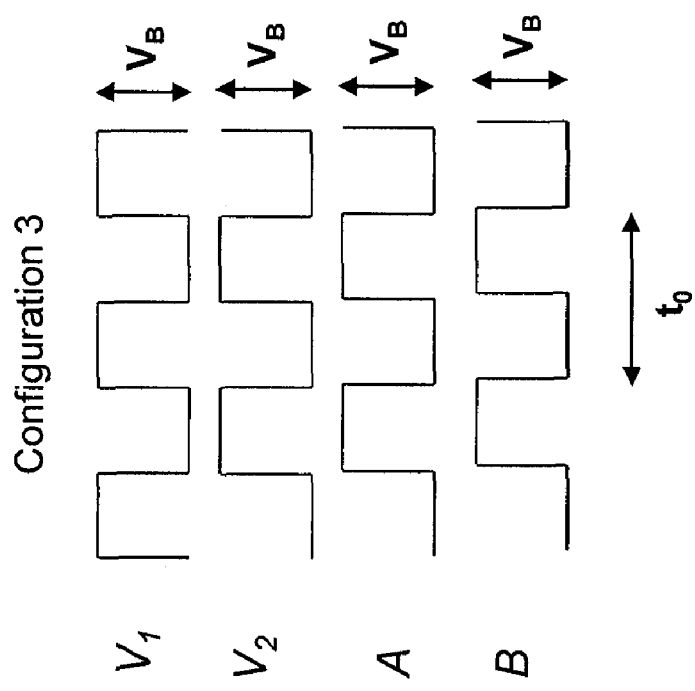
FIG. 15 shows timing signals for operation of the array element circuit in a third configuration according to the second embodiment.

FIGS. 13, 14 and 15 show the timing of the voltages supplied to $V_1$ and $V_2$, and to the connections to the heater electrode A and B for three configurations of operation. In each of these configurations, the voltage supply $V_2$ is also applied to the top electrode 28. The three configurations have the following functions:

Configuration 1: High voltage maintained between the heater electrode 38D and the top electrode 28, for electro-wetting control (high level)
Configuration 2: Voltage maintained between terminals A and B of the heater electrode 38D for Joule heating
Configuration 3: Zero voltage maintained between the heater electrode 38D and the top electrode 28, for electro-wetting control (low level)

Figure 16:
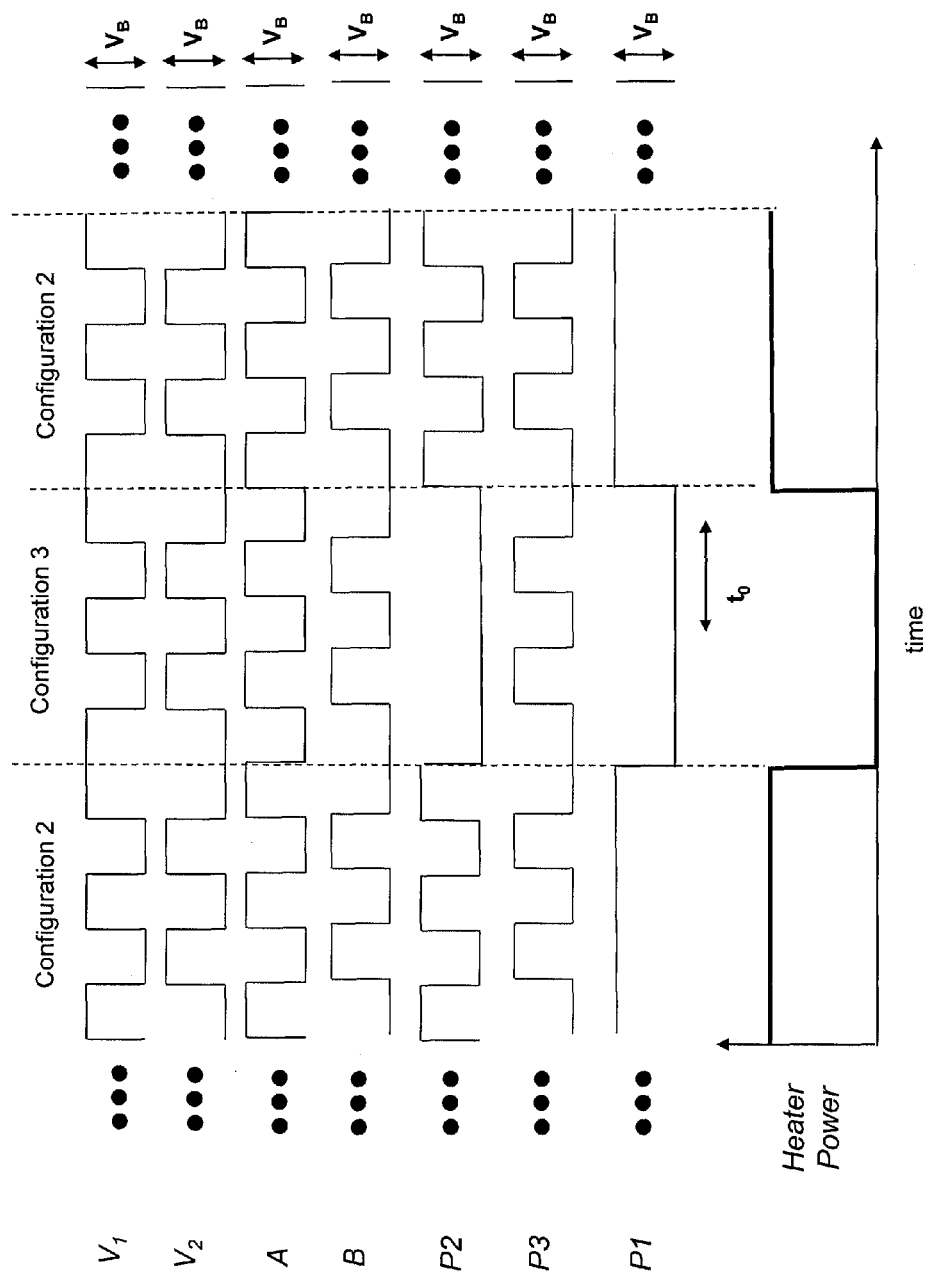
FIG. 16 shows timing signals for operation of the array element circuit using different configuration according to the second embodiment.

A method of driving the heater element 38D analogous to the PWM driving of the first embodiment may also be implemented as a method of controlling the time averaged heater power dissipated. FIG. 16 shows a timing diagram for one such possible implementation utilizing the driver circuit of FIG. 12B and including the timing signals of the inputs P1, P2 and P3 which may be supplied by external means. The voltages supplied to the connections to the second EW drive electrode 38D that are denoted A and B are configured such that for some of the time configuration 2 is adopted and heat is dissipated in the heater electrode 38D. At other times configuration 3 is adopted and no heat is dissipated in the heater electrode. (Configuration 1 could alternatively be adopted instead on configuration 3 for the no heating condition). The time dependence of the heater power dissipated is shown in the bottom part of FIG. 16.

The advantage of this embodiment is that the full heater element functionality described in the first embodiment is combined with the advantages of droplet control by electro-wetting utilizing an AC driving scheme.

It will be apparent to one skilled in the art how the memory function 118 described for this embodiment could alternatively be implemented by a DRAM memory element, for example as described in the first embodiment It will further be apparent to one skilled in the art how the various geometries and heater zone configurations described for the first embodiment may equally be implemented and operated using the AC drive schemes described in the second embodiment.

Figure 17:
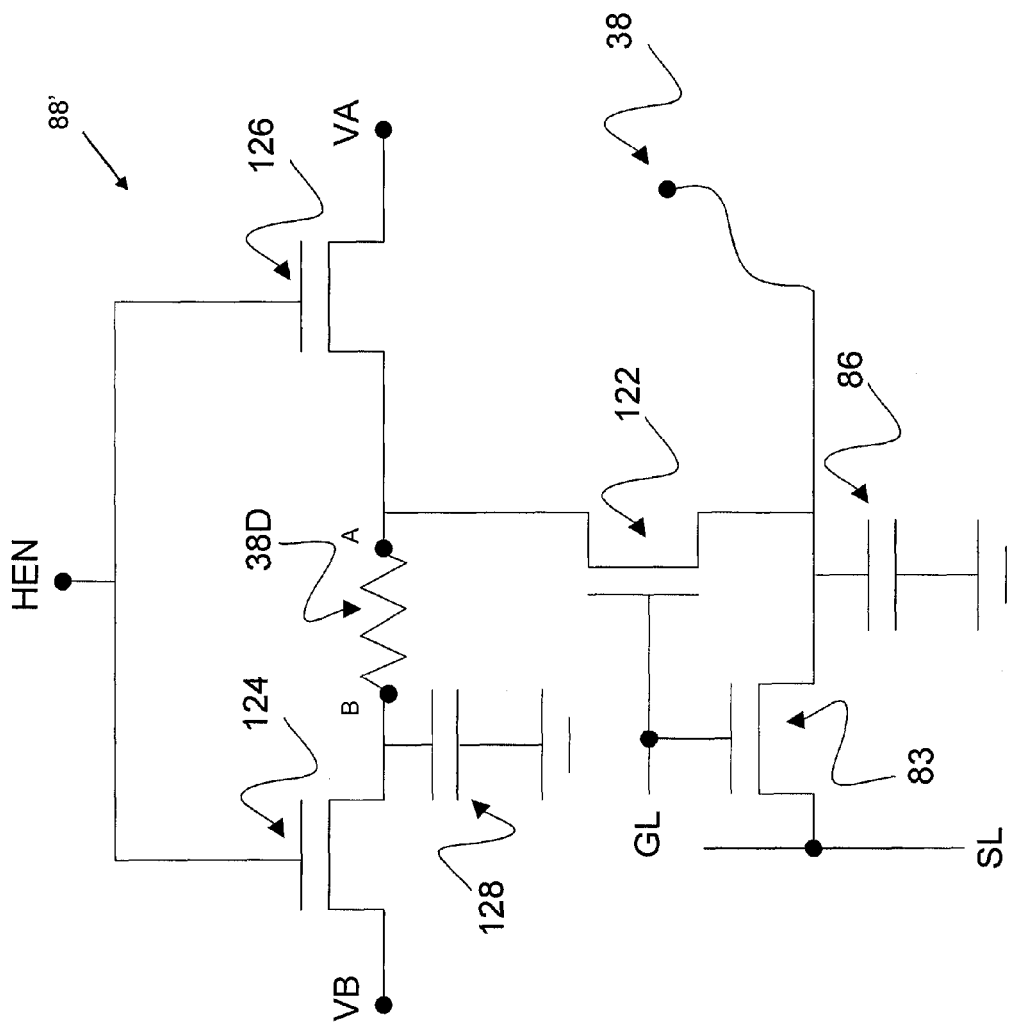
FIG. 17 shows an array element circuit of a heater array element according to a third embodiment of the invention.

A third embodiment of the invention is as the first embodiment where the array element driver circuit of the standard array element 84 is as previously described and an alternative array element driver circuit is implemented for the heater array element 88' as shown in FIG. 17.

The heater array element driver circuit contains the following elements:

A column write line SL (originating from the column driver 78), which may be common to array elements within the same column
A row select line GL (originating from the row driver 76), which may be common to array elements within the same row
An n-type switch transistor 83
A capacitor 86
A capacitor 128
An n-type switch transistor 122
An n-type switch transistor 124
An n-type switch transistor 126
A heater enable line HEN, used for control of the heating operation
Heater supply voltage input line VA
Heater supply voltage input line VB The circuit is connected as follows:

The row select line GL is connected to the gate of transistor 83 and to the gate of transistor 122. The column write line SL is connected to the source of transistor 83. The drain of transistor 83 is connected to the drain of transistor 122 and to the EW drive electrode 38. Capacitor 86 is connected between the EW drive electrode 38 and a ground line. The source of transistor 122 is connected to the source of transistor 126 and to input A of the second EW drive electrode 38D. The drain of transistor 124 is connected to input B of the second EW drive electrode 38D. The capacitor 128 is connected between input B of the second EW drive electrode 38D and a ground line. The heater enable line HEN is connected to the gate of transistor 126 and to the gate of transistor 124. The source of transistor 126 is connected to the heater supply voltage input line VA of the second EW drive electrode 38D and the drain of transistor 124 is connected to heater supply voltage input line VA. Similarly, the drain of transistor 126 is connected to input B of the second EW drive electrode 38D and the source of transistor 124 is connected to heater supply voltage input line VB.

The operation of the circuit is described as follows:
The array element driver circuit performs two functions
Writing an electro-wetting control voltage to both the EW drive electrode 38 and the second EW drive electrode 38D
Performing Joule heating in the second EW drive electrode 38D, whilst maintaining the voltage written to the EW drive electrode 38

In order to write a voltage to the EW drive electrode 38 and the second EW drive electrode 38D, a voltage low level is first applied to the input HEN so that transistors 124 and 126 are switched off. The column line SL is then loaded with the voltage to be written. A voltage high level pulse is then applied to the gate line GL, thus switching on transistors 83 and 122 and writing the voltage on SL to the EW drive electrode 38 and the second EW drive electrode 38D. The written voltage is then held across capacitors 86 and 128 respectively when the voltage on the gate line GL is taken low.

In order to operate so as to perform Joule heating in the heater drive electrode 38D, a voltage is applied to heater supply input line VA, and a different voltage is applied to the heater supply input line VB. The voltage on input HEN is then taken high so that transistors 124 and 126 are switched on. The capacitor 128 will quickly be charged/discharged and a current will pass between the inputs A and B, thus effecting Joule heating in the second EW drive electrode 38D. The value of the current will depend upon the voltage difference between VA and VB and resistance of the current flow path. The circuit may be designed such that the on resistance of transistors 124 and 126 is small compared to the resistance of the second EW drive electrode 38D such that most of the Joule heat is effected in the second EW drive electrode 38D.

It may be noted that in an array containing many heater array elements 88', the connections to the heater supply voltage input lines VA and VB may be global to each heater array element 88' within the array 42. The electro-wetting voltage written to the second EW drive electrode 38D of each heater array element 88' may be controlled independently, since this voltage is written through the same array addressing architecture also used to write an electro-wetting voltage to the EW drive electrode 38.

Connections to the heater enable input HEN of each heater array element 88' in the array may be provided individually or may be common to multiple heater array elements 88' within the array. Providing individual connections gives the flexibility that heating in the heater drive electrodes 38D may be controlled individually for different heater array elements although has the disadvantage of requiring more connecting wires to control the HEN connections of each heater array element in the array.

It will be apparent to one skilled in the art how the heater power may be controlled by PWM means, by applying a time varying signal to the input HEN such that the heater power dissipated is a function of the duty cycle of the voltage pulse supplied to HEN.

It will further be apparent to one skilled in the art how this embodiment may also incorporate features described in the first and second embodiments The advantage of this embodiment is that the voltage of the second EW drive electrode 38D may be written through the same array write functionality used to write a voltage to the EW drive electrode 38. Therefore different voltages may be written to different heater drive electrodes 38D in the array, without the requirement to supply individual control signals to each of the different heater drive electrodes 38D as would be the case in the first embodiment. This is a big advantage in complicated configurations containing many heater array elements 88' within an array where there is a requirement to control the voltage of the heater drive electrodes 38D of each of these elements independently.

Figure 18:
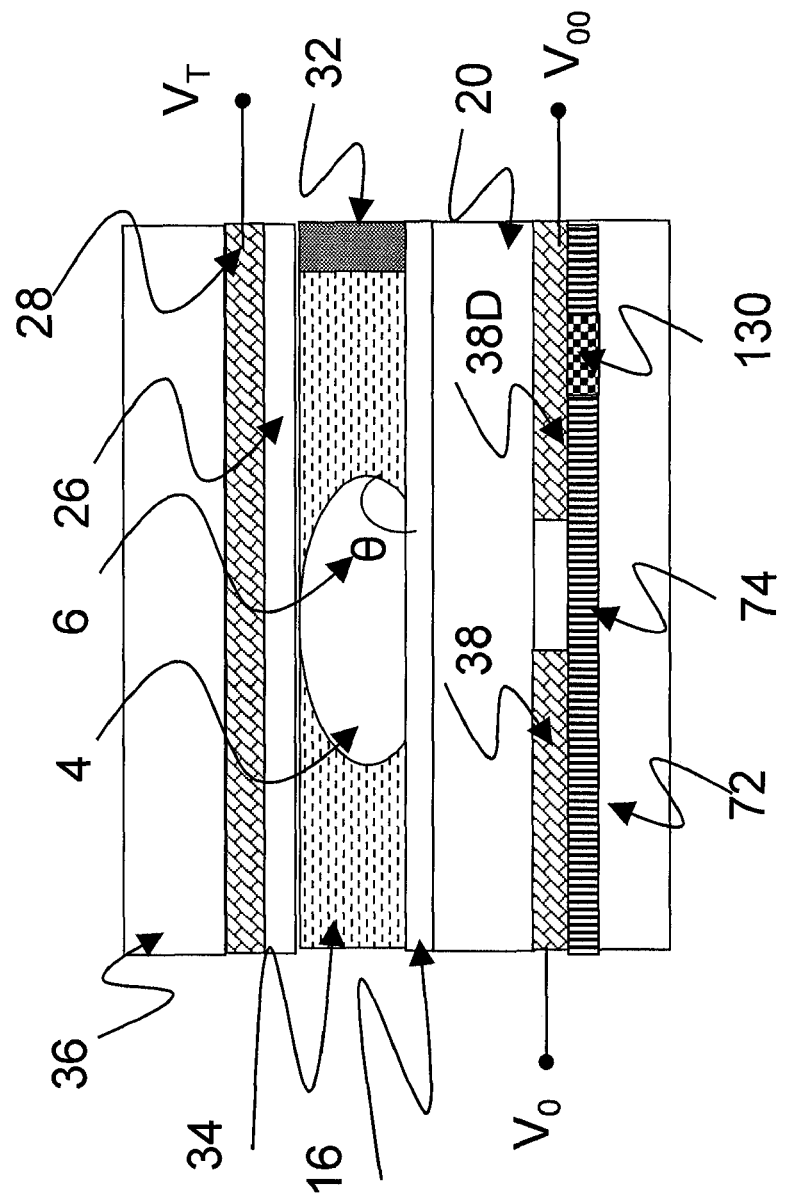
FIG. 18 shows a cross section through some of the array elements of the device in accordance with a fourth embodiment of the invention.

A fourth embodiment of the invention is as any of the previous embodiments where the thin film electronics 74 additionally contains a temperature sensor element 130 as described in prior art. FIG. 18 shows a cross section of the device according to this embodiment. As shown in the figure, the temperature sensor element 130 may in some instances be arranged in close proximity to the second EW drive electrode 38D, for example where it is advantageous to get rapid feedback information from applied heating. In other instances it may be better to locate the temperature sensor further away from the second EW drive electrode 38D or to have a multipliplicty of temperature sensor elements 130 at different distances from the second EW drive electrode in order to determine the temperature profile at different locations within the device. One or more temperature sensor elements 130 may be included at the position of each standard array element 84 and/or heater array element to form an array of temperature sensor elements 130 and give spatial information on the temperature distribution through the device.

An advantage of this embodiment is that the inclusion of temperature sensors facilitates feedback—the signals applied to the second EW drive electrode 38D to implement heating may be varied and controlled in accordance with the measured temperature.

It may be noted that a particular feature of this embodiment is that the second EW drive electrode 38D may be spatially located between the temperature sensor and the liquid droplet, all in very close physical proximity. This provides particular advantages. Firstly, the thermal resistance between the heater element and temperature sensor element may be very small so that the sensor element responds rapidly to temperature changes initiated by Joule heating. Secondly, the close proximity of the droplet, heater element and temperature sensor element enable the temperature close to the droplet to be measured accurately.

Whilst the previous embodiments of the invention have been directed towards Active Matrix EWOD (i.e. EWOD devices with the array element driver circuits and heater control circuits for the EW drive electrodes 38 and second EW drive electrodes 38D integrated on the same substrate 72 as the EW drive electrodes 38 and 38D), it will be obvious to one skilled in the art that the invention is equally applicable to passive EWOD. Namely, all or part of the array element driver circuits and/or heater control circuits may be formed externally or off the electrode array substrate 72, for example on a separate printed circuit board. The electrical connections to the EW drive electrodes 38 and 38D are thereby supplied externally. In this case the EW drive electrodes may be arranged as described previously and shown for example in any of FIG. 7, 9 or 10 and electrical connections to the EW drive electrodes 38 and to the second EW drive electrodes 38D of array elements containing heater functionality may be supplied directly from external driver electronics, for example as generated by a separate printed circuit board.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The AM-EWOD device could form a part of a lab-on-a-chip system. Such devices could be used in manipulating, reacting and sensing chemical, biochemical or physiological materials. Applications include healthcare diagnostic testing, chemical or biochemical material synthesis, proteomics, tools for research in life sciences and forensic science.

The invention claimed is:
1. An electrowetting on dielectric (EWOD) device, comprising:
 a plurality of array elements configured to manipulate one or more droplets of fluid on an array, each of the array elements including a corresponding array element driver circuit,
 wherein each array element driver circuit includes:
  a top substrate electrode and a first drive electrode between which the one or more droplets may be positioned, the top substrate electrode being formed on a top substrate, and the first drive electrode being formed on a lower substrate; and
  circuitry configured to selectively provide drive voltages to the first drive electrode to move the one or more droplets among the plurality of array elements, and
 wherein at least one of the plurality of array elements includes:
  a heater element also formed on the lower substrate and configured to heat the one or more droplets when positioned between the top substrate electrode and the first drive electrode of the at least one array element; and circuitry configured to control the heater element.

2. The device according to claim 1, wherein the heater element comprises a second drive electrode, and the circuitry configured to control the heater element is configured to switch the second drive electrode between a first mode of operation in which drive voltages are provided to the second drive electrode to control an electro-wetting force exerted by the second drive electrode on the one or more droplets, and a second mode of operation in which the drive voltages provided to the second drive electrode cause the second drive electrode to dissipate thermal energy to heat the one or more droplets.

3. The device according to claim 2, wherein in the first mode of operation the circuitry configured to control the heater element holds the second drive electrode at a same voltage potential as the first drive electrode.

4. The device according to claim 3, wherein in the second mode of operation the circuitry configured to control the heater element presents a difference in voltage potential across the second drive electrode to produce resistive heat energy.

5. The device according to claim 4, wherein the difference in voltage potential is pulse-width modulated to control a rate of heating in the second mode of operation.

6. The device according to claim 4, wherein a value of the difference in potential is varied to control a rate of heating in the second mode of operation.

7. The device according to claim 2, wherein the drive voltages provided to the first drive electrodes are in accordance with an AC driving scheme.

8. The device according to claim 2, wherein in the at least one of the plurality of array elements the first drive electrode is formed around a perimeter of the second drive electrode.

9. The device according to claim 8, wherein the second drive electrode is oriented to maximize a distance to corners of the first drive electrode.

10. The device according to claim 1, wherein the at least one of the plurality of array elements comprises multiple array elements.

11. The device according to claim 10, wherein the multiple array elements include contiguous array elements.

12. The device according to claim 11, further including a third drive electrode around a perimeter of the contiguous array elements.

13. The device according to claim 10, wherein the circuitry configured to control the heater element within the multiple array elements is shared among the multiple array elements.

14. The device according to claim 10, wherein each of the multiple array elements includes its own separate circuitry configured to control the heater element therein.

15. The device according to claim 1, wherein the circuitry configured to control the heater element is configured to receive a control voltage through a same write functionality as the circuitry configured to selectively provide drive voltages to the first drive electrode.

16. The device according to claim 1, wherein the at least one of the plurality of array elements further includes a temperature sensor.

17. The device according to claim 16, wherein the temperature sensor is formed on the lower substrate so that the heater element is positioned between the temperature sensor and the one or more droplets.

18. The device according to claim 1, wherein all or part of at least one of the circuitry configured to selectively provide drive voltages and the circuitry configured to control the heater element is formed on the lower substrate.

19. The device according to claim 1, wherein all or part of at least one of the circuitry configured to selectively provide drive voltages and the circuitry configured to control the heater element is formed off of the lower substrate.

20. A method for driving an electrowetting on dielectric (EWOD) device, comprising:
a plurality of array elements configured to manipulate one or more droplets of fluid on an array, each of the array elements including a corresponding array element driver circuit,
wherein each array element driver circuit includes:
a top substrate electrode and a first drive electrode between which the one or more droplets may be positioned, the top substrate electrode being formed on a top substrate, and the first drive electrode being formed on a lower substrate; and
circuitry configured to selectively provide drive voltages to the first drive electrode to move the one or more droplets among the plurality of array elements, and
wherein at least one of the plurality of array elements includes:
a heater element also formed on the lower substrate and configured to heat the one or more droplets when positioned between the top substrate electrode and the first drive electrode of the at least one array element, the heater element comprising a second drive electrode; and
circuitry configured to provide drive voltages the second electrode,
the method including the steps of:
switching the second drive electrode between a first mode of operation in which the drive voltages are provided to the second drive electrode to control an electro-wetting force exerted by the second drive electrode on the one or more droplets, and a second mode of operation in which the drive voltages provided to the second drive electrode cause the second drive electrode to dissipate thermal energy to heat the one or more droplets.

21. The method according to claim 20, comprising holding the second drive electrode at the same voltage potential as the first drive electrode during the first mode of operation.

22. The method according to claim 21, comprising presenting a difference in voltage potential across the second drive electrode to produce resistive heat energy during the second mode of operation.

23. The method according to claim 22, comprising pulse-width modulating the difference in voltage potential to control a rate of heating in the second mode of operation.

24. The method according to claim 22, comprising varying a value of the potential difference to control a rate of heating in the second mode of operation.

25. The method according to claim 20, wherein the drive voltages provided to the first drive electrodes are in accordance with an AC driving scheme.

* * * * *